(12) United States Patent
Park et al.

(10) Patent No.: US 11,949,864 B2
(45) Date of Patent: Apr. 2, 2024

(54) VIDEO CODING METHOD AND DEVICE, VIDEO DECODING METHOD AND DEVICE

(71) Applicant: SAMSUNG ELECTRONICS CO., LTD., Suwon-si (KR)

(72) Inventors: Min-soo Park, Seoul (KR); Min-woo Park, Yongin-si (KR); Bo-ra Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/301,013

(22) Filed: Apr. 14, 2023

(65) Prior Publication Data
US 2023/0254486 A1 Aug. 10, 2023

Related U.S. Application Data

(63) Continuation of application No. 17/740,035, filed on May 9, 2022, now Pat. No. 11,652,995, which is a
(Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/13* (2014.11); *H04N 19/176* (2014.11)

(58) Field of Classification Search
None
See application file for complete search history.

(56) References Cited

U.S. PATENT DOCUMENTS 9,137,533 B2 9/2015 Lee et al.
9,237,355 B2 1/2016 Chien et al.
(Continued)

FOREIGN PATENT DOCUMENTS

CA 2572566 A1 7/2001
CA 2614571 A1 7/2001
(Continued)

OTHER PUBLICATIONS

Communication dated Feb. 21, 2020 from the European Patent Office in application No. 18828450.9.
(Continued)

*Primary Examiner* — Talha M Nawaz
(74) *Attorney, Agent, or Firm* — Sughrue Mion, PLLC

(57) ABSTRACT

Provided are an encoding method and apparatus, and a decoding method and apparatus for adaptively selecting a context model used to entropy-encode and entropy-decode a syntax element, based on various shapes of coding units. The image decoding method includes: determining a context model based on block shape information including at least one of a shape, direction, width, ratio of width and height, or size of a coding unit; obtaining, from a bitstream based on the context model, information about a split shape mode for splitting the coding unit; and determining a split shape mode of the coding unit, based on the information about the split shape mode.

4 Claims, 21 Drawing Sheets

Related U.S. Application Data continuation of application No. 16/623,252, filed as application No. PCT/KR2018/003761 on Mar. 30, 2018, now Pat. No. 11,330,259.

(60) Provisional application No. 62/529,556, filed on Jul. 7, 2017.

(51) Int. Cl.
*H04N 19/13* (2014.01)
*H04N 19/176* (2014.01)

(56) References Cited

U.S. PATENT DOCUMENTS

| | | | |
|---|---|---|---|
| 9,374,579 | B2 | 6/2016 | Chen et al. |
| 9,479,784 | B2 | 10/2016 | Lee et al. |
| 9,807,426 | B2 | 10/2017 | Guo et al. |
| 2011/0134998 | A1 | 6/2011 | Lee et al. |
| 2012/0081241 | A1 | 4/2012 | Misra et al. |
| 2014/0219335 | A1* | 8/2014 | Lee ............... H04N 19/46 375/240.02 |
| 2015/0189278 | A1 | 7/2015 | Lee et al. |
| 2015/0189279 | A1* | 7/2015 | Lee ............... H04N 19/18 375/240.02 |
| 2015/0326879 | A1* | 11/2015 | Alshina ........... H04N 19/593 375/240.12 |
| 2016/0156823 | A1 | 6/2016 | Yoshida et al. |
| 2017/0142448 | A1 | 5/2017 | Karczewicz et al. |
| 2017/0195671 | A1 | 7/2017 | Choi |
| 2018/0332288 | A1 | 11/2018 | Hsiang et al. |
| 2020/0359033 | A1* | 11/2020 | Ramasubramonian ............ H04N 19/463 |
| 2021/0152823 | A1 | 5/2021 | Park et al. |

FOREIGN PATENT DOCUMENTS

| | | |
|---|---|---|
| CN | 1665303 A | 9/2005 |
| CN | 102783149 A | 11/2012 |
| CN | 103220524 A | 7/2013 |
| CN | 103430541 A | 12/2013 |
| CN | 103561275 A | 2/2014 |
| CN | 103636215 A | 3/2014 |
| CN | 106028048 A | 10/2016 |
| EP | 2 663 075 B1 | 5/2020 |
| JP | 2009-156982 A | 7/2009 |
| KR | 10-2015-0040819 A | 4/2015 |
| KR | 10-2015-0052817 A | 5/2015 |
| KR | 10-2017-0020778 A | 2/2017 |
| KR | 10-2205905 B1 | 1/2021 |
| WO | 2017088810 A1 | 6/2017 |

OTHER PUBLICATIONS

Chen, J., et al., "Simplified context model selection for block level syntax coding", Joint Collaborative Team on Video Coding (JCT-VC) of ITU-T SG16 WP3 and ISO/IEC JTC1/SC29/WG11, Jul. 14-22, 2011, pp. 1-3, XP030009520.

International Search Report (PCT/ISA/210) & Written Opinion (PCT/ISA/237) dated Jul. 13, 2018 issued by the International Searching Authority in International Application No. PCT/KR 2018/003761.

Communication dated Sep. 23, 2021 by the Korean Intellectual Property Office in counterpart Korean Patent Application No. 10-2021-7000586.

Bross, Benjamin et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14, 2013-Jan. 23, 2013, Document: JCTVC-L1003_v34. (310 pages total).

Communication dated Jun. 22, 2020 by the Korean Intellectual Property Office in counterpart Korean Patent Application No. 10-2019-7034034.

Communication dated May 9, 2021, issued by the Korean Patent Office in counterpart Korean Patent Application No. 10-2021-7000586.

Communication dated May 28, 2021, issued by the State Intellectual Property Office of P.R. China in counterpart Chinese Application No. 201880044834.9.

Communication dated Jan. 4, 2023 issued by the State Intellectual Property Office of the P.R.China in application No. 202210313435.6.

Communication dated Jan. 4, 2023 issued by the State Intellectual Property Office of the P.R.China in application No. 202210314193.2.

Hong, Z., et al., "Fast Partition Algorithm for HVEC Coding Unit Based on Depth Prediction", Computer Applications and Software, vol. 34, No. 5, May 2017, pp. 229-233.

Jun, G., et al., A New Region-based Image Coding Method Using Binary Tree, China Journal of Image and Graphics, vol. 1, No. 3, Jul. 1996, pp. 205-210.

Notice of Allowance dated Oct. 8, 2023, issued by Chinese Patent Office in Chinese Patent Application No. 202210316052.4.

* cited by examiner

FIG. 4
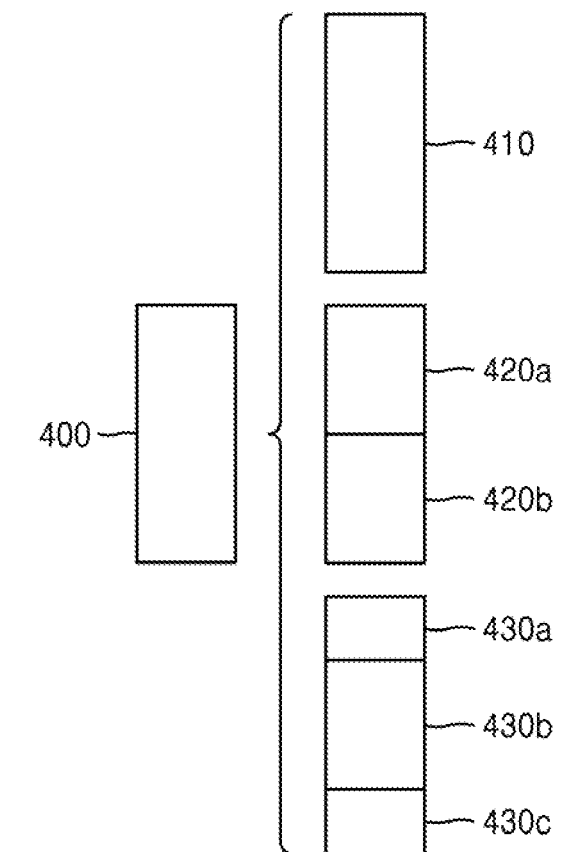
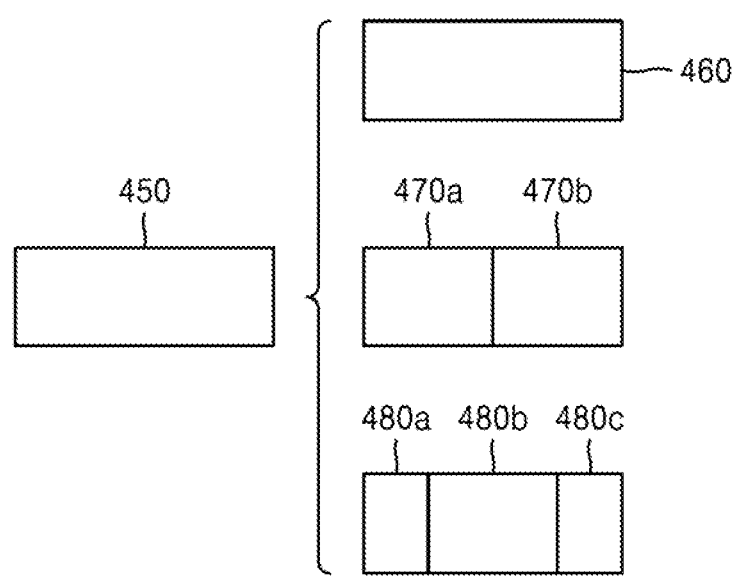

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

| SHAPE OF CODING UNIT | RATIO OF WIDTH AND HEIGHT OF CODING UNIT | DIRECTION OF CODING UNIT |
|---|---|---|
| Square | 1:1 | – |
| Non-square | 1:2 | VERTICAL DIRECTION |
| | 2:1 | HORIZONTAL DIRECTION |
| | 1:4 | VERTICAL DIRECTION |
| | 4:1 | HORIZONTAL DIRECTION |
| | 1:8 | VERTICAL DIRECTION |
| | 8:1 | HORIZONTAL DIRECTION |

LENGTH OF WIDTH

| RATIO | 4 | 8 | 16 | 32 | 64 | 128 |
|---|---|---|---|---|---|---|
| 8:1 | X | X | X | 32x4 | 64x8 | 128x16 |
| 4:1 | X | X | 16x4 | 32x8 | 64x16 | 128x32 |
| 2:1 | X | 8x4 | 16x8 | 32x16 | 64x32 | 128x64 |
| 1:1 | 4x4 | 8x8 | 16x16 | 32x32 | 64x64 | 128x128 |
| 1:2 | 4x8 | 8x16 | 16x32 | 32x64 | 64x128 | X |
| 1:4 | 4x16 | 8x32 | 16x64 | 32x128 | X | X |
| 1:8 | 4x32 | 8x64 | 16x128 | X | X | X |

FIG. 19

1910 — LENGTH OF WIDTH

| RATIO | 4 | 8 | 16 | 32 | 64 | 128 |
|---|---|---|---|---|---|---|
| 8:1 | X | X | X | 32x4 | 64x8 | 128x16 |
| 4:1 | X | X | 16x4 | 32x8 | 64x16 | 128x32 |
| 2:1 | X | 8x4 | 16x8 | 32x16 | 64x32 | 128x64 |
| 1:1 | 4x4 | 8x8 | 16x16 | 32x32 | 64x64 | 128x128 |
| 1:2 | 4x8 | 8x16 | 16x32 | 32x64 | 64x128 | X |
| 1:4 | 4x16 | 8x32 | 16x64 | 32x128 | X | X |
| 1:8 | 4x32 | 8x64 | 16x128 | X | X | X |

1911, 1915

1920 — LENGTH OF WIDTH

| RATIO | 4 | 8 | 16 | 32 | 64 | 128 |
|---|---|---|---|---|---|---|
| 8:1 | X | X | X | 32x4 | 64x8 | 128x16 |
| 4:1 | X | X | 16x4 | 32x8 | 64x16 | 128x32 |
| 2:1 | X | 8x4 | 16x8 | 32x16 | 64x32 | 128x64 |
| 1:1 | 4x4 | 8x8 | 16x16 | 32x32 | 64x64 | 128x128 |
| 1:2 | 4x8 | 8x16 | 16x32 | 32x64 | 64x128 | X |
| 1:4 | 4x16 | 8x32 | 16x64 | 32x128 | X | X |
| 1:8 | 4x32 | 8x64 | 16x128 | X | X | X |

1921, 1922, 1923

1930 — LENGTH OF WIDTH

| RATIO | 4 | 8 | 16 | 32 | 64 | 128 |
|---|---|---|---|---|---|---|
| 8:1 | X | X | X | 32x4 | 64x8 | 128x16 |
| 4:1 | X | X | 16x4 | 32x8 | 64x16 | 128x32 |
| 2:1 | X | 8x4 | 16x8 | 32x16 | 64x32 | 128x64 |
| 1:1 | 4x4 | 8x8 | 16x16 | 32x32 | 64x64 | 128x128 |
| 1:2 | 4x8 | 8x16 | 16x32 | 32x64 | 64x128 | X |
| 1:4 | 4x16 | 8x32 | 16x64 | 32x128 | X | X |
| 1:8 | 4x32 | 8x64 | 16x128 | X | X | X |

1931, 1932, 1933, 1934, 1935, 1936, 1937

1940 — LENGTH OF HEIGHT

| LENGTH OF WIDTH | 4 | 8 | 16 | 32 | 64 | 128 |
|---|---|---|---|---|---|---|
| 4 | 4x4 | 4x8 | 4x16 | 4x32 | X | X |
| 8 | 8x4 | 8x8 | 8x16 | 8x32 | 8x64 | X |
| 16 | 16x4 | 16x8 | 16x16 | 16x32 | 16x64 | 16x128 |
| 32 | 32x4 | 32x8 | 32x16 | 32x32 | 32x64 | 32x128 |
| 64 | X | 64x8 | 64x16 | 64x32 | 64x64 | 64x128 |
| 128 | X | X | 128x16 | 128x32 | 128x64 | 128x128 |

|  | 4 | 8 | 16 | 32 | 64 | 128 |
|---|---|---|---|---|---|---|
| 4 | X | 4 | 4 | X | X | X |
| 8 | 4 | 4 | 3 | 3 | X | X |
| 16 | 4 | 3 | 3 | 2 | 2 | X |
| 32 | X | 3 | 2 | 2 | 1 | 1 |
| 64 | X | X | 2 | 1 | 1 | 0 |
| 128 | X | X | X | 1 | 0 | 0 |

LENGTH OF HEIGHT

LENGTH OF WIDTH

```
#define NA 255  //never split
#define NB 14   //not reach in current setting of max AR 1:4
define NC 15   //not reach in current setting of max AR 1:4 const u8 ifvc_tbl_split_flag_ctx[6][6] =
{
   {NA,  4,  4, NB, NC, NC},
   { 4,  4,  3,  3, NB, NC},
   { 4,  3,  3,  2,  2, NB},
   {NB,  3,  2,  2,  1,  1},
   {NC, NB,  2,  1,  1,  0},
   {NC, NC, NB,  1,  0,  0},
};
```
— 2110

```
    for(i=0; i<3; i++) /* 0: Up, 1: Left, 2: Right */
    {
        if(avail[i])
        {
            w[i] = width_of_block[i];
            h[i] = height_of_block[i];
            if(i==0)
                smaller[i] = w[i] < current_block_width;
            else
                smaller[i] = h[i] < current_block_height;
        }
    }
    ctx = min(smaller[0] + smaller[1] + smaller[2], 2);
    ctx = ctx + 3 * ifvc_tbl_split_flag_ctx[log2_cuw-2][log2_cuh-2];
```
— 2120

`u8 ctx_dir = (log2_cuw-log2_cuh+2) + dir_ctx_offset;` — 2130

`u8 ctx_typ = 0 + typ_ctx_offset;` — 2140

FIG. 24

| | Descriptor |
|---|---|
| split_unit( ) { | |
|   split_mode | ae(v) |
|   if( split_mode == QUAD_SPLIT \|\| split_mode == BI_VER_SPLIT \|\| | |
|     split_mode == TRI_VER_SPLIT ) { | |
|     suco_info | ae(v) |
|   } | |
|   if( split_info == QUAD_SPLIT ) { | |
|     if( suco_info == 0 ) { | |
|       split_unit( sub_pos_0 ) | |
|       split_unit( sub_pos_1 ) | |
|       split_unit( sub_pos_2 ) | |
|       split_unit( sub_pos_3 ) | |
|     } | |
|     else { | |
|       split_unit( sub_pos_1 ) | |
|       split_unit( sub_pos_0 ) | |
|       split_unit( sub_pos_3 ) | |
|       split_unit( sub_pos_2 ) | |
|     } | |
|   } | |
|   else if( split_mode == BI_VER_SPLIT ) { | |
|     if( suco_info == 0 ) { | |
|       split_unit( sub_pos_0 ) | |
|       split_unit( sub_pos_1 ) | |
|     } | |
|     else { | |
|       split_unit( sub_pos_1 ) | |
|       split_unit( sub_pos_0 ) | |
|     } | |
|   } | |
|   else if( split_mode == BI_HOR_SPLIT ) { | |
|     split_unit( sub_pos_0 ) | |
|     split_unit( sub_pos_1 ) | |
|   } | |
|   else if( split_mode == TRI_VER_SPLIT ) { | |
|     if( suco_info == 0 ) { | |
|       split_unit( sub_pos_0 ) | |
|       split_unit( sub_pos_1 ) | |
|       split_unit( sub_pos_2 ) | |
|     } | |
|     else { | |
|       split_unit( sub_pos_2 ) | |
|       split_unit( sub_pos_1 ) | |
|       split_unit( sub_pos_0 ) | |
|     } | |
|   } | |
|   else if( split_mode == TRI_HOR_SPLIT ) { | |
|     split_unit( sub_pos_0 ) | |
|     split_unit( sub_pos_1 ) | |
|     split_unit( sub_pos_2 ) | |
|   } | |
|   else { // split_mode == NO_SPLIT | |
|     coding_unit( ... ) | |
|   } | |
| } | |

VIDEO CODING METHOD AND DEVICE, VIDEO DECODING METHOD AND DEVICE

CROSS-REFERENCE TO RELATED APPLICATION(S)

This is a continuation of U.S. application Ser. No. 17/740,035 filed May 9, 2022, which is a continuation of U.S. application Ser. No. 16/623,252 filed Dec. 16, 2019, which is a National Stage of International Application No. PCT/KR2018/003761 filed Mar. 30, 2018, which claims the benefit under 35 U.S.C. § 119 from U.S. Provisional Application No. 62/529,556 filed on Jul. 7, 2017, in the United States Patent and Trademark Office, the disclosures of which are incorporated herein by reference in their entireties.

TECHNICAL FIELD

A method and apparatus according to an embodiment may encode or decode an image by using various shapes of coding units included in an image.

BACKGROUND ART

In a general compression method, square coding units are determined through recursive splitting processes in which it is determined whether to split a coding unit included in a picture while determining a size of the coding unit and then the coding unit is uniformly split into four coding units of the same size. However, recently, image quality deterioration of a reconstructed image caused by the use of coding units having the uniform square shape for a high resolution image has become a problem. Accordingly, methods and apparatuses for splitting a high resolution image into coding units of various shapes have been proposed.

The disclosure provides an encoding method and apparatus, and a decoding method and apparatus for adaptively selecting a context model used to entropy-encode and entropy-decode a syntax element, based on various shapes of coding units.

DESCRIPTION OF EMBODIMENTS

Solution to Problem

According to an embodiment of the disclosure, an image decoding method includes: determining a context model based on block shape information including at least one of a shape, direction, width, ratio of width and height, or size of a coding unit; obtaining, from a bitstream based on the context model, information about a split shape mode for splitting the coding unit; and determining a split shape mode of the coding unit, based on the information about the split shape mode.

The determining of the context model may include: obtaining an array for matching at least one of the shape, direction, ratio of width and height, or size of the coding unit with an index for the context model; obtaining the index for the context model from the array, based on at least one of the shape, direction, ratio of width and height, or size of the coding unit; and determining the context model based on the index for the context model.

The shape of the coding unit may indicate whether the coding unit is a square or a rectangle, the direction of the coding unit may indicate whether the coding unit is in a horizontal direction or a vertical direction, the ratio of width and height of the coding unit may include at least one of 1:1, 1:2, 1:4, 1:8, 2:1, 4:1, and 8:1, and the size of the coding unit may indicate the length of one side or the area of the coding unit.

The determining of the context model may include determining the context model further based on block shape information including at least one of a shape, direction, ratio of width and height, or size of a peripheral coding unit adjacent to the coding unit, wherein the peripheral coding unit may include at least one of coding units located at bottom left, left, top left, top, top right, right, and bottom right of the coding unit.

The determining of the context model may include: comparing the length of width of the top peripheral coding unit and the length of width of the coding unit; comparing the lengths of heights of the left and right peripheral coding units and the length of height of the coding unit; and determining the context model based on results of the comparing.

The information about the split shape mode may include at least one of information indicating whether to perform splitting, split direction information, and split type information, wherein the information indicating whether to perform splitting may indicate whether to split a coding unit, the split direction information may indicate a split into one of a horizontal direction or a vertical direction, and the split type information may indicate splitting of the coding unit via one of a binary split, a tri split, or a quad split.

According to an embodiment of the disclosure, an image decoding apparatus includes at least one processor, wherein the at least one processor is configured to perform: determining a context model based on block shape information including at least one of a shape, direction, width, ratio of width and height, or size of a coding unit; obtaining, from a bitstream based on the context model, information about a split shape mode for splitting the coding unit; and determining a split shape mode of the coding unit, based on the information about the split shape mode.

According to an embodiment of the disclosure, an image encoding method includes: determining information about a split shape mode, based on a split shape mode of a coding unit; determining a context model based on block shape information including at least one of a shape, direction, width, ratio of width and height, or size of the coding unit; and generating a bitstream including the information about the split shape mode for splitting the coding unit, based on the context model.

The determining of the context model may include: obtaining an array for matching at least one of the shape, direction, ratio of width and height, or size of the coding unit with an index for the context model; obtaining the index for the context model from the array, based on at least one of the shape, direction, ratio of width and height, or size of the coding unit; and determining the context model based on the index for the context model.

The shape of the coding unit may indicate whether the coding unit is a square or a rectangle, the direction of the coding unit may indicate whether the coding unit is in a horizontal direction or a vertical direction, the ratio of width and height of the coding unit may include at least one of 1:1, 1:2, 1:4, 1:8, 2:1, 4:1, and 8:1, and the size of the coding unit may indicate the length of one side or the area of the coding unit.

The determining of the context model may include: determining the context model further based on block shape information including at least one of a shape, direction, ratio of width and height, or size of a peripheral coding unit adjacent to the coding unit, wherein the peripheral coding unit may include at least one of coding units located at bottom left, left, top left, top, top right, right, and bottom right of the coding unit.

The determining of the context model may include: comparing the length of width of the top peripheral coding unit and the length of width of the coding unit; comparing the lengths of heights of the left and right peripheral coding units and the length of height of the coding unit; and determining the context model based on results of the comparing.

The information about the split shape mode may include at least one of information indicating whether to perform splitting, split direction information, and split type information, wherein the information indicating whether to perform splitting may indicate whether to split a coding unit, the split direction information may indicate a split into one of a horizontal direction or a vertical direction, and the split type information may indicate splitting of the coding unit via one of a binary split, a tri split, or a quad split.

According to an embodiment of the disclosure, an image encoding apparatus includes at least one processor, wherein the at least one processor is configured to perform: determining information about a split shape mode, based on a split shape mode of a coding unit; determining a context model based on block shape information including at least one of a shape, direction, width, ratio of width and height, or size of the coding unit; and generating a bitstream including the information about the split shape mode for splitting the coding unit, based on the context model.

According to an embodiment of the disclosure, a computer-readable recording medium may have recorded thereon a computer program for performing the image decoding method.

BRIEF DESCRIPTION OF DRAWINGS

FIG. 4 illustrates a process, performed by an image decoding apparatus, of determining at least one coding unit by splitting a non-square coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 17 is a diagram for describing block shape information according to an embodiment.

FIG. 18 is a diagram for describing block shape information according to an embodiment.

FIG. 19 is a diagram for describing a process of determining a context model according to block shape information, according to an embodiment.

FIG. 20 is a diagram for describing a method of determining a context model, according to an embodiment.

FIG. 21 is a diagram for describing a method of determining a context model, according to an embodiment.

FIG. 24 is a diagram for describing a method of splitting of a current coding unit, according to an embodiment.

MODE OF DISCLOSURE

Figure 1:
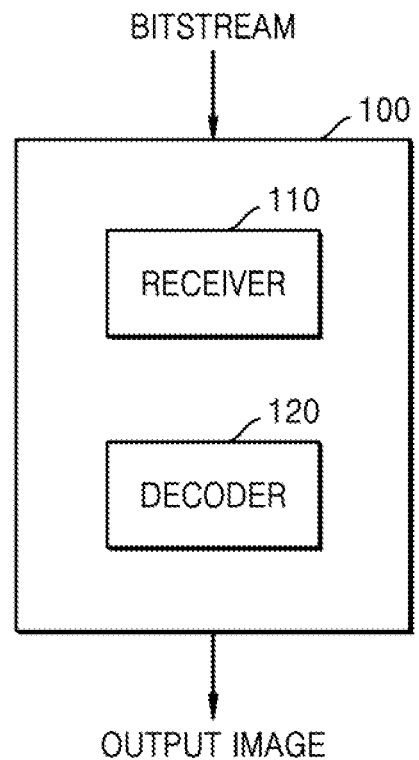
FIG. 1 is a schematic block diagram of an image decoding apparatus 100 according to an embodiment.

Advantages and features of one or more embodiments and methods of accomplishing the same may be understood more readily by reference to the embodiments and the accompanying drawings. In this regard, the embodiments of the disclosure may have different forms and should not be construed as being limited to the descriptions set forth herein. Rather, these embodiments are provided so that this disclosure will be thorough and complete and will fully convey the concept of the present embodiments of the disclosure to one of ordinary skill in the art.

The terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EE-PROM), a flash memory, a magnetic or optical data storage device, a register, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

Hereinafter, embodiments will be described in detail with reference to the accompanying drawings such that one of ordinary skill in the art may easily implement the embodiments. In the drawings, parts irrelevant to the description are omitted to clearly describe the present disclosure.

Hereinafter, an image encoding apparatus and an image decoding apparatus, and an image encoding method and an image decoding method according to embodiments will be described with reference to FIGS. 1 through 24. A method of determining a data unit of an image, according to an embodiment, will be described with reference to FIGS. 3 through 16, and an encoding or decoding method and apparatus for adaptively selecting a context model, based on various shapes of coding unit, according to an embodiment, will be described with reference to FIGS. 1, 2, and 17 through 24.

Hereinafter, the method and apparatus for adaptively selecting a context model, based on various shapes of coding unit, according to an embodiment of the disclosure, will be described with reference to FIGS. 1 and 2.

FIG. 1 is a schematic block diagram of an image decoding apparatus 100 according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image by obtaining information based on the received bitstream. The decoder 120 may determine the context model based on at least one of a shape, direction, ratio of width and height, or size of a coding unit. The decoder 120 may obtain, from the bitstream, a syntax element for reconstructing the image, based on a context model. The decoder 120 may reconstruct the image based on the syntax element.

Operations of the image decoding apparatus 100 will be described in detail with reference to FIG. 2.

Figure 2:
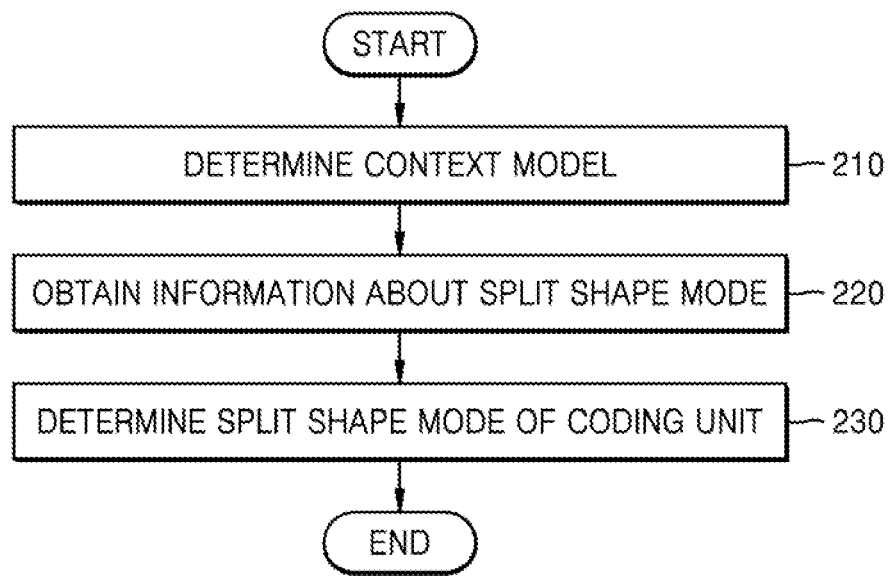
FIG. 2 is a flowchart of an image decoding method according to an embodiment.

FIG. 2 is a flowchart of an image decoding method according to an embodiment.

According to an embodiment of the disclosure, the receiver 110 receives a bitstream. The image decoding apparatus 100 determines a context model based on at least one of a shape, direction, ratio of width and height, or size of a coding unit (operation 210). The image decoding apparatus 100 obtains, from the bitstream, based on the context model, information about a split shape mode for splitting the coding unit (operation 220). The image decoding apparatus 100 determines a split shape mode of the coding unit, based on the information about the split shape mode (operation 230).

The image may be split into largest coding units. The size of the largest coding unit may be determined based on information obtained from the bitstream. The shapes of the largest coding units may be squares of the same sizes. However, an embodiment is not limited thereto. Also, the largest coding unit may be hierarchically split into coding units, based on information about the split shape mode obtained from the bitstream. The coding unit may be smaller than or same as the largest coding unit. For example, when the information about the split shape mode indicates not to perform splitting, the coding unit has the same size as the largest coding unit. When the information about the split shape mode indicates to perform splitting, the largest coding unit may be split into coding units. Also, when the information about the split shape mode of the coding unit indicates to perform splitting, the coding unit may be split into smaller coding units. However, the splitting of the image is not limited thereto, and the largest coding unit and the coding unit may not be distinguished. The splitting of the coding unit will be described in detail with reference to FIGS. 3 through 16.

The coding unit may be split into a prediction unit for prediction of the image. The prediction unit may be the same as or smaller than the coding unit. Also, the coding unit may be split into a transform unit for transform of the image. The transform unit may be the same as or smaller than the coding unit. The shapes and sizes of the transform unit and prediction unit may not be related to each other. The coding unit may be distinguished from the prediction unit and the transform unit, but the coding unit, the prediction unit, and the transform unit may be the same. Splitting of the prediction unit and transform unit may be performed in the same manner as the splitting of the coding unit. The splitting of the coding unit will be described in detail with reference to FIGS. 3 through 16. A current block and a peripheral block of the disclosure may indicate one of the largest coding unit, the coding unit, the prediction unit, and the transform unit. Also, the current block is a block on which decoding or encoding is currently performed. The peripheral block may be a block reconstructed before the current block. The peripheral block may be adjacent to the current block spatially or temporally. The peripheral block may be located at one of the bottom left, left, top left, top, top right, right, bottom right of the current block.

Figure 3:
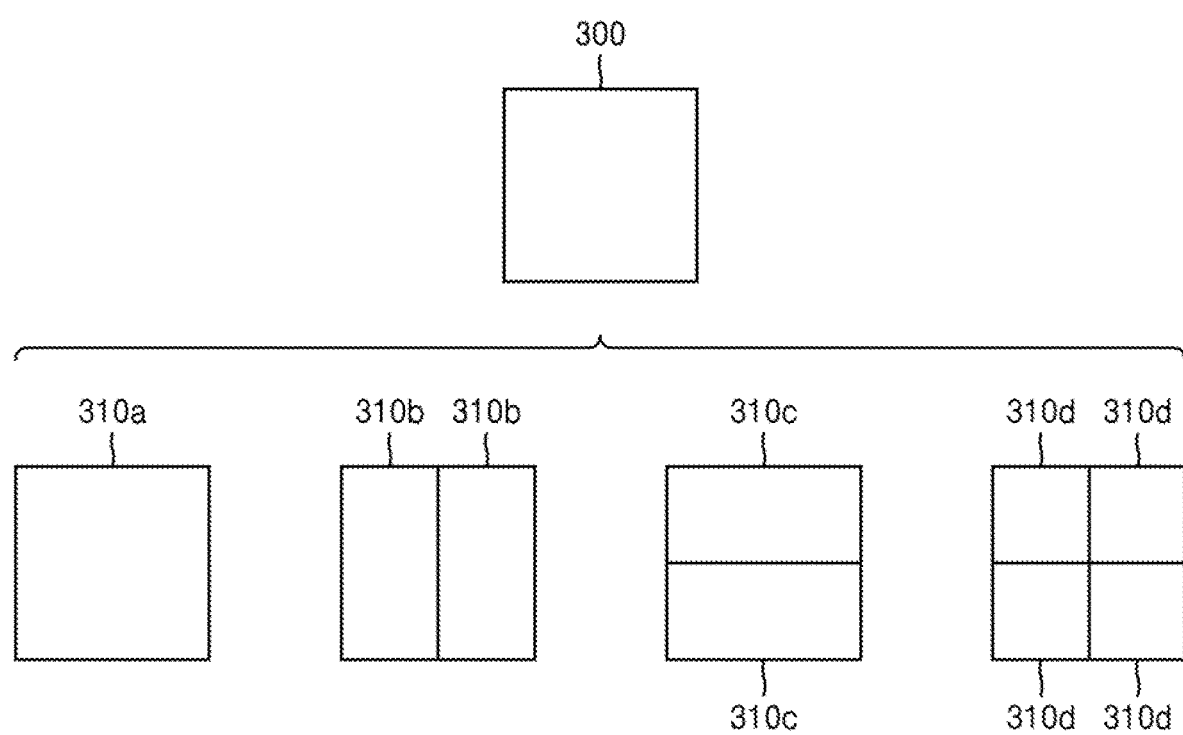
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (4N×4N), the image decoding apparatus 100 may determine the block shape information of the coding unit to be a square. The image decoding apparatus 100 may determine the shape of the coding unit to be a non-square.

When the lengths of the width and height of the coding unit are different (4N×2N, 2N×4N, 4N×N, or N×4N), the image decoding apparatus 100 may determine the block shape information of the coding unit as a non-square. When the shape of the coding unit is non-square, the image decoding apparatus 100 may determine the ratio of the width and height among the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the information about the split shape mode. That is, a coding unit splitting method indicated by the information indicating the split shape mode may be determined based on a block shape indicated by the block shape information used by the image decoding apparatus 100.

The image decoding apparatus 100 may obtain the information about the split shape mode from a bitstream. However, an embodiment is not limited thereto, and the image decoding apparatus 100 and the image encoding apparatus 2200 may obtain information about a pre-agreed split shape mode, based on the block shape information. The image decoding apparatus 100 may obtain the information about the pre-agreed split shape mode with respect to a largest coding unit or a smallest coding unit. For example, the image decoding apparatus 100 may determine the size of the largest coding unit to be 256×256. The image decoding apparatus 100 may determine the information about the pre-agreed split shape mode to be a quad split. The quad split is a split shape mode in which the width and the height of the coding unit are both bisected. The image decoding apparatus 100 may obtain a coding unit of a 128×128 size from the largest coding unit of a 256×256 size, based on the information about the split shape mode. Also, the image decoding apparatus 100 may determine the size of the smallest coding unit to be 4×4. The image decoding apparatus 100 may obtain information about a split shape mode indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 3, when the block shape information of a current coding unit 300 indicates a square shape, the decoder 120 may determine that a coding unit 310a having the same size as the current coding unit 300 is not split, based on the information about the split shape mode indicating not to perform splitting, or may determine coding units 310b, 310c, or 310d split based on the information about the split shape mode indicating a predetermined splitting method.

Referring to FIG. 3, according to an embodiment, the image decoding apparatus 100 may determine two coding units 310b obtained by splitting the current coding unit 300 in a vertical direction, based on the information about the split shape mode indicating to perform splitting in a vertical direction. The image decoding apparatus 100 may determine two coding units 310c obtained by splitting the current coding unit 300 in a horizontal direction, based on the information about the split shape mode indicating to perform splitting in a horizontal direction. The image decoding apparatus 100 may determine four coding units 310d obtained by splitting the current coding unit 300 in vertical and horizontal directions, based on the information about the split shape mode indicating to perform splitting in vertical and horizontal directions. However, splitting methods of the square coding unit are not limited to the above-described methods, and the information about the split shape mode may indicate various methods. Predetermined splitting methods of splitting the square coding unit will be described in detail below in relation to various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on information about a split shape mode. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the information about the split shape mode indicating not to perform splitting, or determine coding units 420a and 420b, 430a to 430c, 470a and 470b, or 480a to 480c split based on the information about the split shape mode indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the information about the split shape mode and, in this case, the information about the split shape mode may indicate the number of one or more coding units generated by splitting a coding unit. Referring to FIG. 4, when the information about the split shape mode indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the information about the split shape mode.

According to an embodiment, when the image decoding apparatus 100 splits the non-square current coding unit 400 or 450 based on the information about the split shape mode, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the information about the split shape mode indicates to split a coding unit into the odd number of blocks (tri split), the image decoding apparatus 100 may determine the odd number of coding units included in the current coding unit 400 or 450. For example, when the information about the split shape mode indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height.

When the ratio of the width and height is 1:4, the block shape information may be a vertical direction because the length of the width is shorter than the length of the height. The image decoding apparatus 100 may determine to split a current coding unit into the odd number of blocks, based on the information about the split shape mode. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the information about the split shape mode indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a predetermined number of times, unlike the other coding units 430a and 430c, or 480a and 480c.

Figure 5:
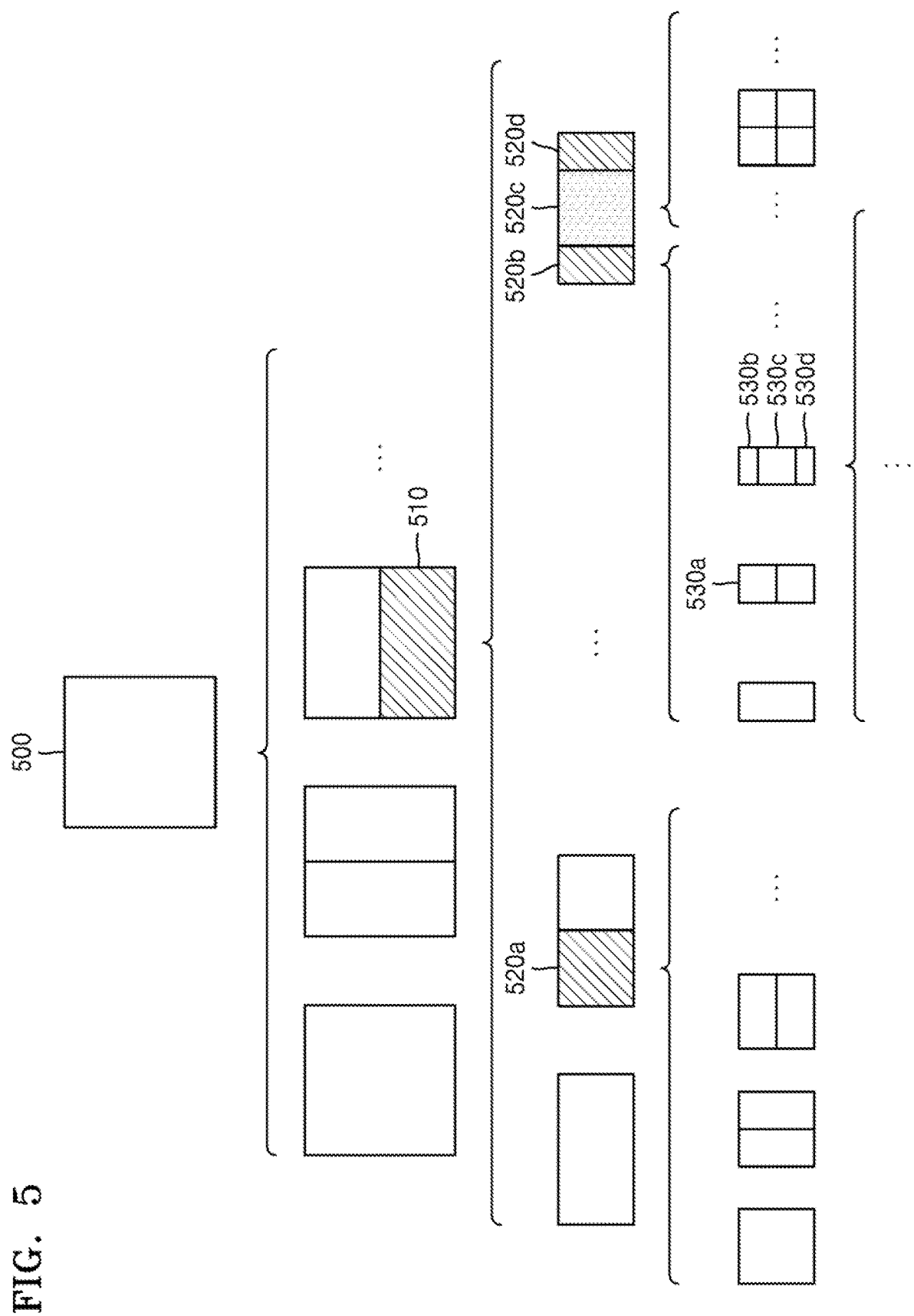
FIG. 5 illustrates a process, performed by an image decoding apparatus, of splitting a coding unit based on at least one of block shape information and information about a split shape mode, according to an embodiment.

FIG. 5 illustrates a process, performed by the image decoding apparatus 100, of splitting a coding unit based on at least one of block shape information and information about a split shape mode, according to an embodiment.

According to an embodiment, the image decoding apparatus 100 may determine to split or not to split a square first coding unit 500 into coding units, based on at least one of the block shape information and the information about the split shape mode. According to an embodiment, when the information about the split shape mode indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit.

It will be understood that the structure of the first coding unit, the second coding unit, and the third coding unit follows the above descriptions.

According to an embodiment, the image decoding apparatus 100 may determine to split or not to split the determined second coding unit 510 into coding units, based on at least one of the block shape information and the information about the split shape mode. Referring to FIG. 5, the image decoding apparatus 100 may or may not split the non-square second coding unit 510, which is determined by splitting the first coding unit 500, into one or more third coding units 520a, or 520b, 520c, and 520d based on at least one of the block shape information and the information about the split shape mode. The image decoding apparatus 100 may obtain at least one of the block shape information and the information about the split shape mode, and determine a plurality of various-shaped second coding units (e.g., 510) by splitting the first coding unit 500, based on the obtained at least one of the block shape information and the information about the split shape mode, and the second coding unit 510 may be split by using the splitting method of the first coding unit 500, based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520a, or 520b, 520c, and 520d based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 5, a predetermined coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split the third coding unit 520a, 520b, 520c, or 520d into coding units, based on the block shape information and the information about the split shape mode. Also, the image decoding apparatus 100 may determine not to split the second coding unit 510, based on at least one of the block shape information and the information about the split shape mode. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of the block shape information and the information about the split shape mode, which is used to split a current coding unit, from a predetermined location in the current coding unit.

Figure 6:
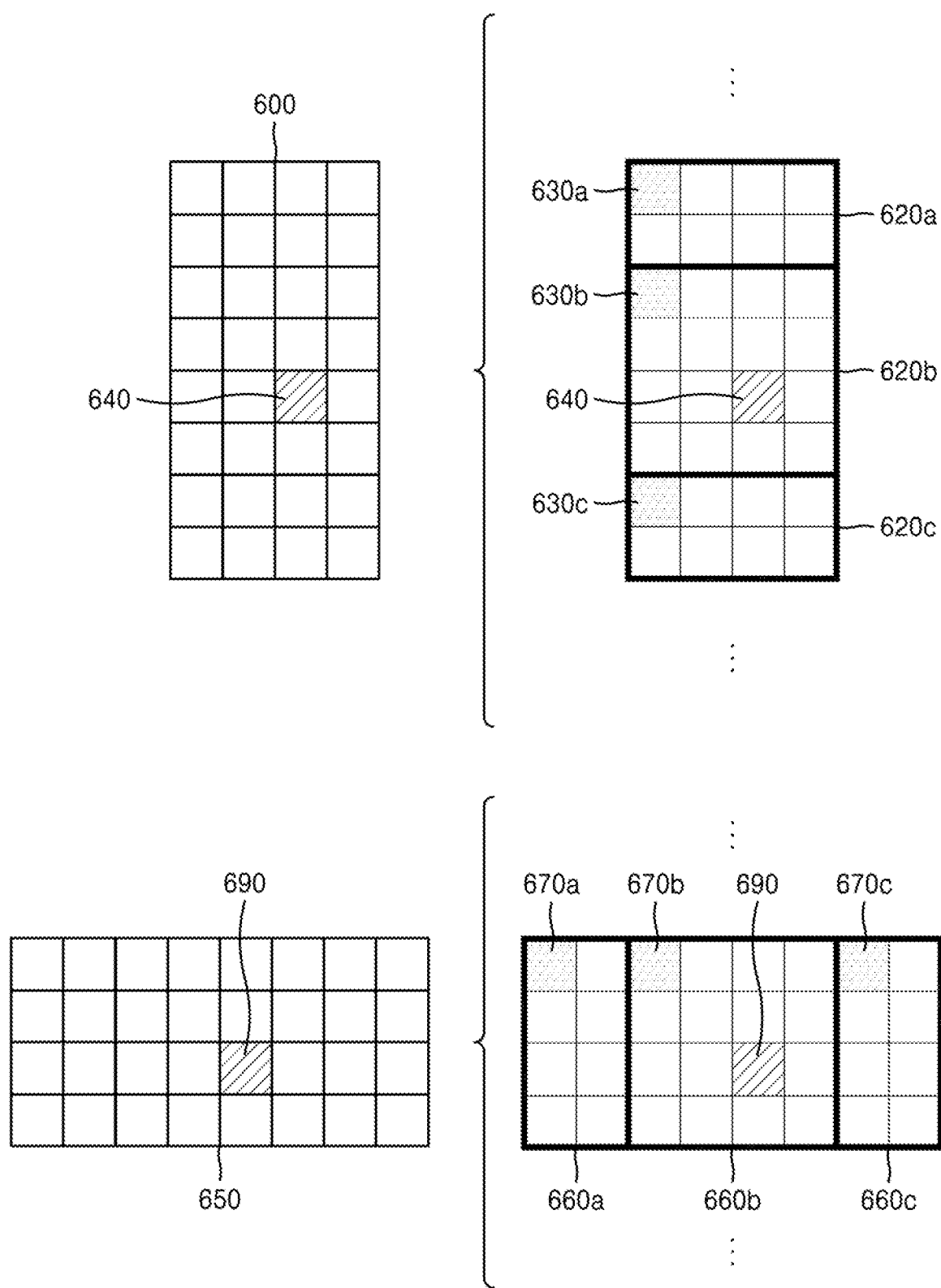
FIG. 6 illustrates a method, performed by an image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, at least one of block shape information and information about a split shape mode of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one of the block shape information and the information about the split shape mode may be obtained, is not limited to the center location in FIG. 6, and may include various locations included in the current coding unit 600 (e.g., top, bottom, left, right, top left, bottom left, top right, and bottom right locations). The image decoding apparatus 100 may obtain at least one of the block shape information and the information about the split shape mode from the predetermined location and determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c with reference to the location of the top left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the top left sample 630a of the upper coding unit 620a, the coordinates (xb, yb) that is the information indicating the location of the top left sample 630b of the middle coding unit 620b, and the coordinates (xc, yc) that is the information indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of a top left sample 670a of the left coding unit 660a, the coordinates (xe, ye) that is information indicating the location of a top left sample 670b of the middle coding unit 660b, and the coordinates (xf, yf) that is information indicating a location of the top left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 600. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a* to 660*c*. Referring to FIG. 6, the image decoding apparatus 100 may determine the middle coding unit 660*b*, which has a size different from the sizes of the left and right coding units 660*a* and 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine the even number of coding units by splitting (binary-splitting) the current coding unit and determine the coding unit at the predetermined location by using information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and information about a split shape mode, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into a plurality of coding units 620*a*, 620*b*, and 620*c* based on at least one of the block shape information and the information about the split shape mode, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which at least one of the block shape information and the information about the split shape mode is obtained. That is, at least one of the block shape information and the information about the split shape mode of the current coding unit 600 may be obtained from the sample 640 at a center location of the current coding unit 600 and, when the current coding unit 600 is split into the plurality of coding units 620*a*, 620*b*, and 620*c* based on at least one of the block shape information and the information about the split shape mode, the coding unit 620*b* including the sample 640 may be determined as the coding unit at the center location. However, information used to determine the coding unit at the center location is not limited to at least one of the block shape information and the information about the split shape mode, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use at least one of the block shape information and the information about the split shape mode, which is obtained from a sample at a predetermined location in the current coding unit 600 (e.g., a sample at a center location of the current coding unit 600) to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620*b* including a sample, from which predetermined information (e.g., at least one of the block shape information and the information about the split shape mode) may be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information may be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 100 may use at least one of the block shape information and the information about the split shape mode to determine a coding unit at a predetermined location from among the plurality of coding units. According to an embodiment, the image decoding apparatus 100 may obtain at least one of the block shape information and the information about the split shape mode from a sample at a predetermined location in a coding unit, and split the plurality of coding units, which are generated by splitting the current coding unit, by using at least one of the information about the split shape mode and the information about the split shape mode, which is obtained from the sample of the predetermined location in each of the plurality of coding units. That is, a coding unit may be recursively split based on at least one of the block shape information and the information about the split shape mode, which is obtained from the sample at the predetermined location in each coding unit. An operation of recursively splitting a coding unit has been described above in relation to FIG. 5, and thus a detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
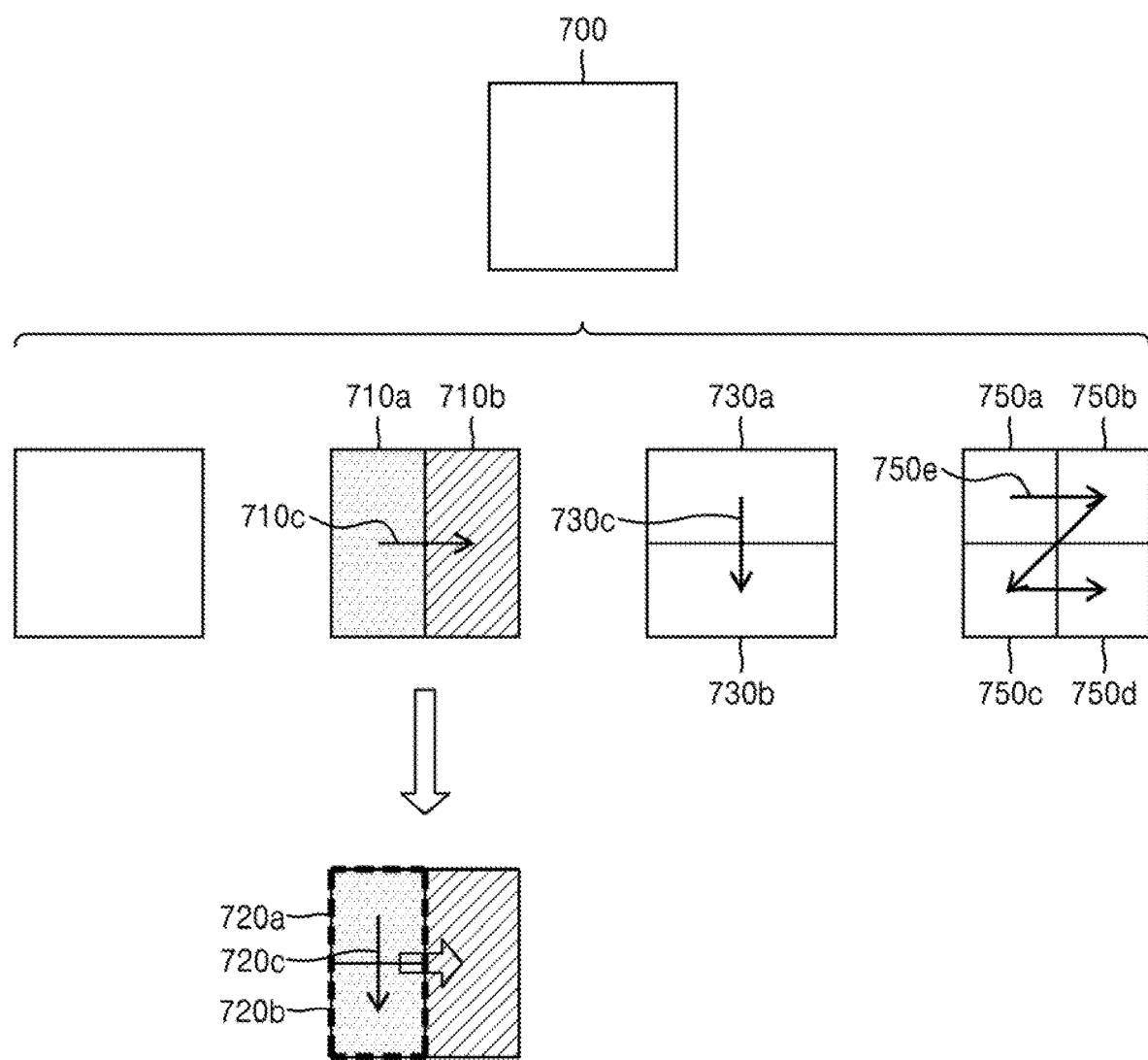
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, determine second coding units 730*a* and 730*b* by splitting the first coding unit 700 in a horizontal direction, or determine second coding units 750*a* to 750*d* by splitting the first coding unit 700 in vertical and horizontal directions, based on block shape information and information about a split shape mode.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine to process the second coding units 750*a* to 750*d*, which are determined by splitting the first coding unit 700 in vertical and horizontal directions, in a predetermined order for processing coding units in a row and then processing coding units in a next row (e.g., in a raster scan order or Z-scan order 750*e*).

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a* to 750*d* by splitting the first coding unit 700, and recursively split each of the determined plurality of coding units 710*b*, 730*a* and 730*b*, or 750*a* to 750*d*. A splitting method of the plurality of coding units 710*b*, 730*a* and 730*b*, or 750*a* to 750*d* may correspond to a splitting method of the first coding unit 700. As such, each of the plurality of coding units 710*b*, 730*a* and 730*b*, or 750*a* to 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
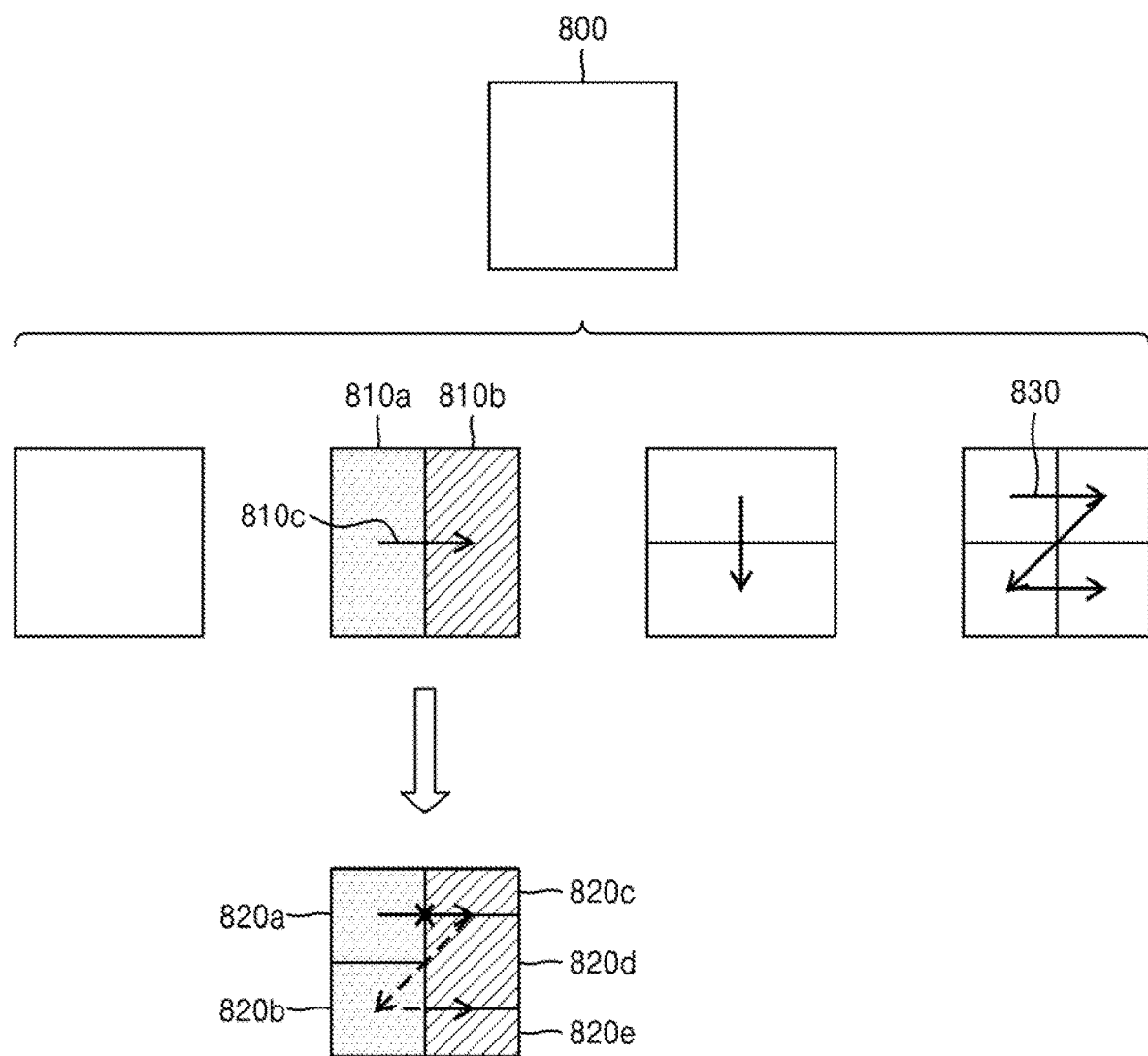
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained block shape information and information about a split shape mode. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* to 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* to 820*e*.

According to an embodiment, the image decoding apparatus 100 may determine whether any coding unit is split into an odd number of coding units, by determining whether the third coding units 820*a* and 820*b*, and 820*c* to 820*e* are processable in a predetermined order. Referring to FIG. 8, the image decoding apparatus 100 may determine the third coding units 820*a* and 820*b*, and 820*c* to 820*e* by recursively splitting the first coding unit 800. The image decoding apparatus 100 may determine whether any of the first coding unit 800, the second coding units 810*a* and 810*b*, and the third coding units 820*a* and 820*b*, and 820*c* to 820*e* are split into an odd number of coding units, based on at least one of the block shape information and the information about the split shape mode. For example, the right second coding unit 810*b* among the second coding units 810*a* and 810*b* may be split into an odd number of third coding units 820*c*, 820*d*, and 820*e*. A processing order of a plurality of coding units included in the first coding unit 800 may be a predetermined order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the predetermined order.

According to an embodiment, the image decoding apparatus 100 may determine whether the third coding units 820*a* and 820*b*, and 820*c* to 820*e* included in the first coding unit 800 satisfy the condition for processing in the predetermined order, and the condition relates to whether at least one of a width and height of the second coding units 810*a* and 810*b* is split in half along a boundary of the third coding units 820*a* and 820*b*, and 820*c* to 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
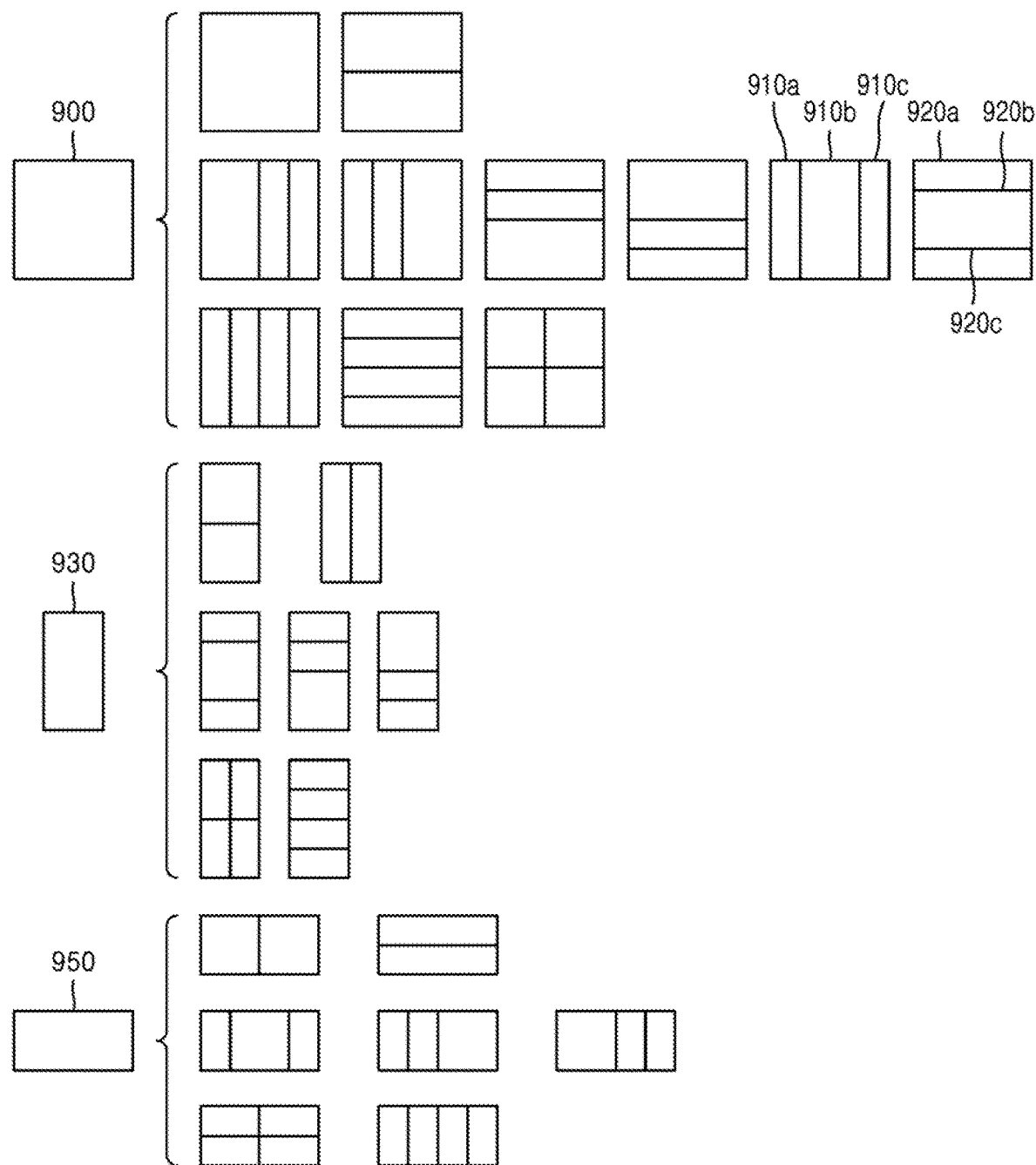
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and information about a split shape mode, which is obtained through the receiver 110. The square first coding unit 900 may be split into four square coding units, or may be split into a plurality of non-square coding units. For example, referring to FIG. 9, when the block shape information indicates that the first coding unit 900 has a square shape and the information about the split shape mode indicates to split the first coding unit 900 into non-square coding units, the image decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920*a*, 920*b*, and 920*c* determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
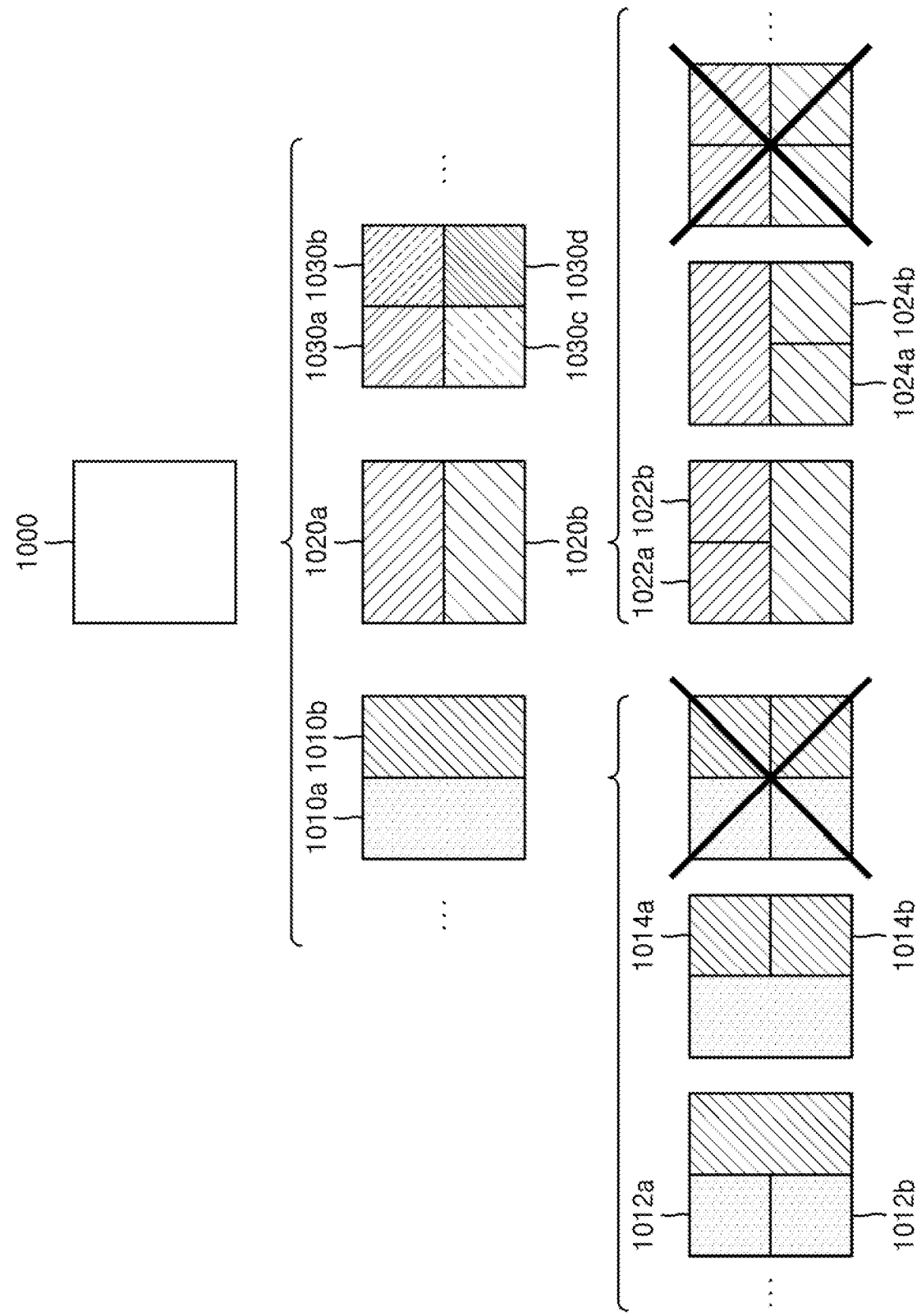
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010*a* and 1010*b* or 1020*a* and 1020*b*, based on at least one of block shape information and information about a split shape mode, which is obtained through the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on at least one of the block shape information and the information about the split shape mode of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the information about the split shape mode, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
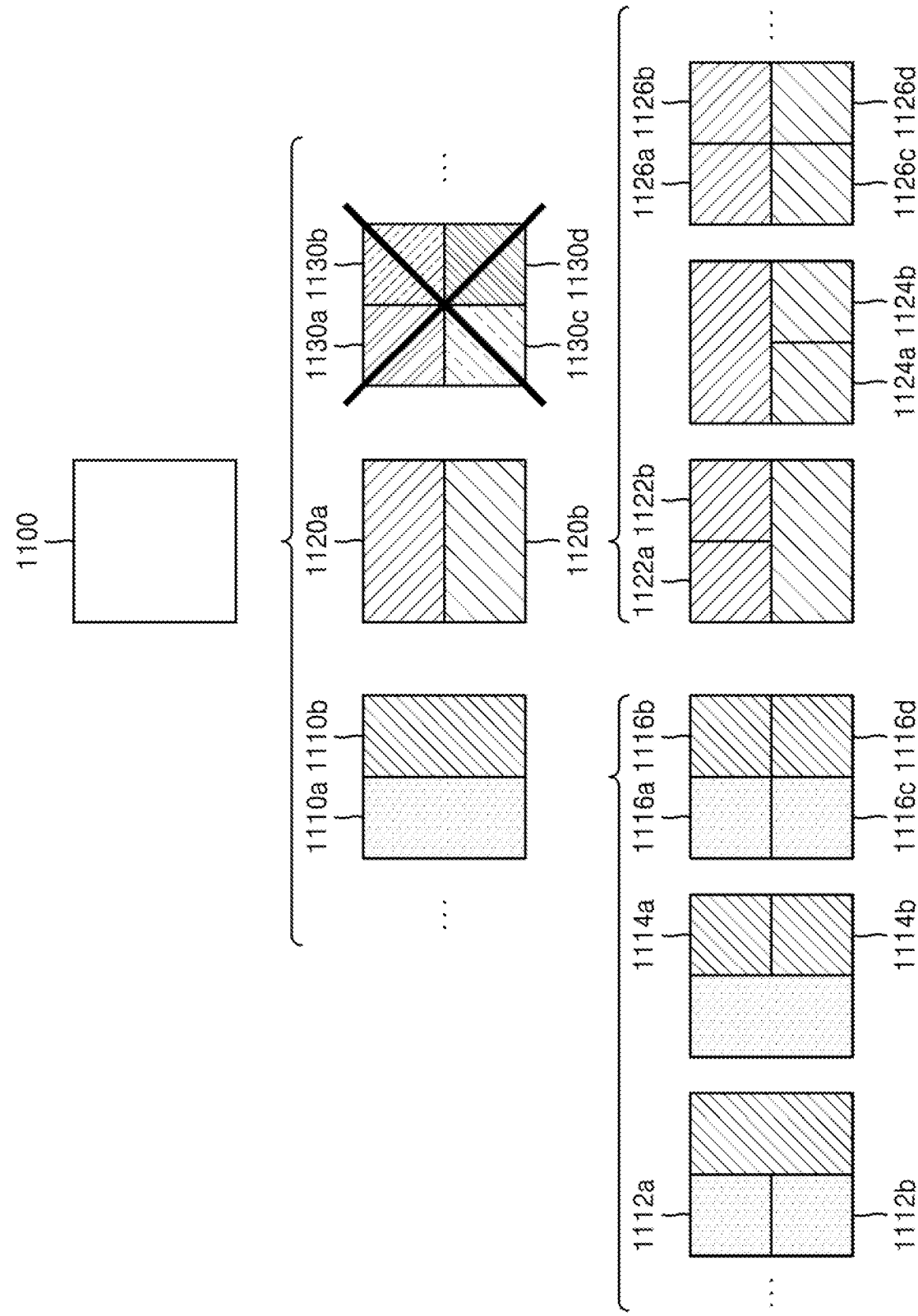
FIG. 11 illustrates a process, performed by an image decoding apparatus, of splitting a square coding unit when information about a split shape mode is unable to indicate that the square coding unit is split into four square coding units, according to an embodiment.

FIG. 11 illustrates a process, performed by the image decoding apparatus 100, of splitting a square coding unit when information about a split shape mode is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and information about a split shape mode. The information about a split shape mode may include information about various methods of splitting a coding unit but, the information about various splitting methods may not include information for splitting a coding unit into four square coding units. According to such information about the split shape mode, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the information about the split shape mode.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the information about the split shape mode.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
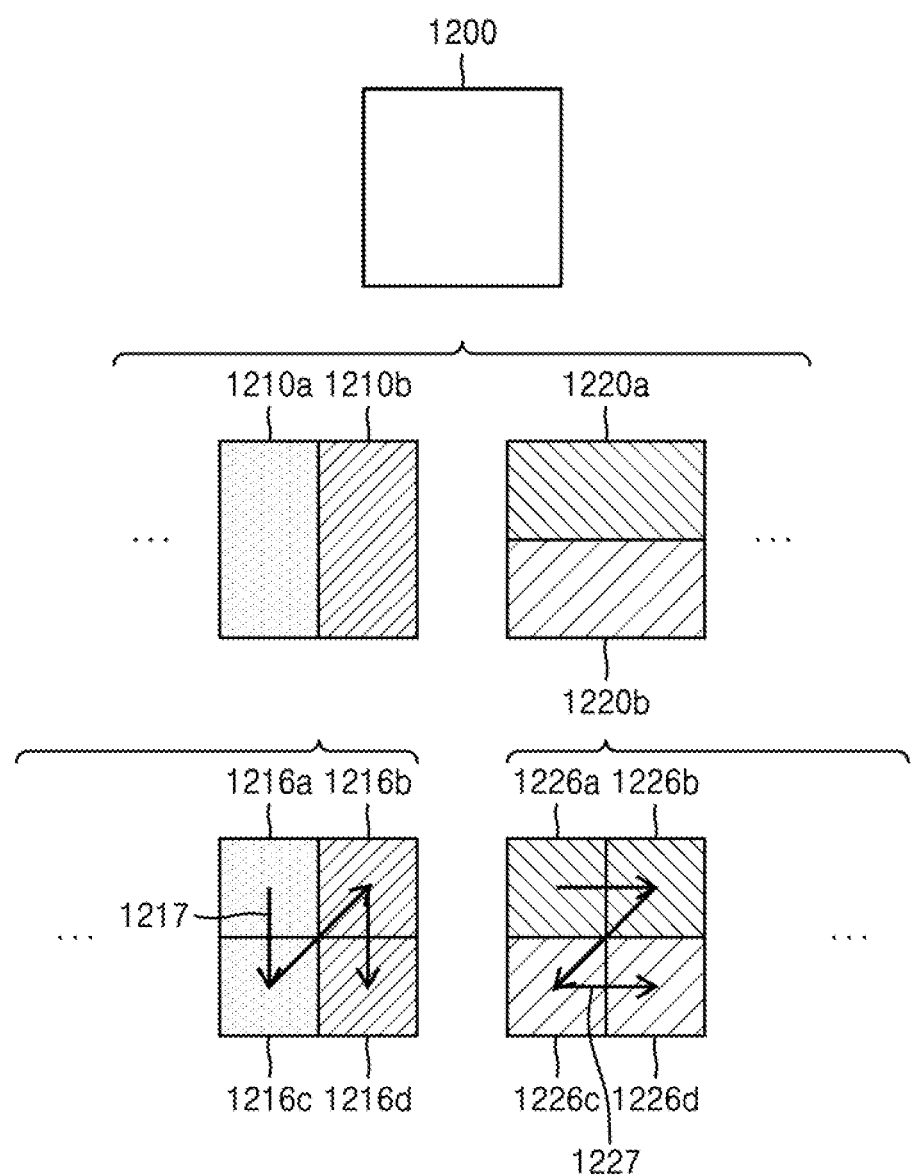
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on block shape information and information about a split shape mode. When the block shape information indicates a square shape and the information about the split shape mode indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the block shape information and the information about the split shape mode of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1920b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information and the information about the split shape mode, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 to ½ may have a size of N×N. Furthermore, the third coding unit 1304 determined by splitting a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
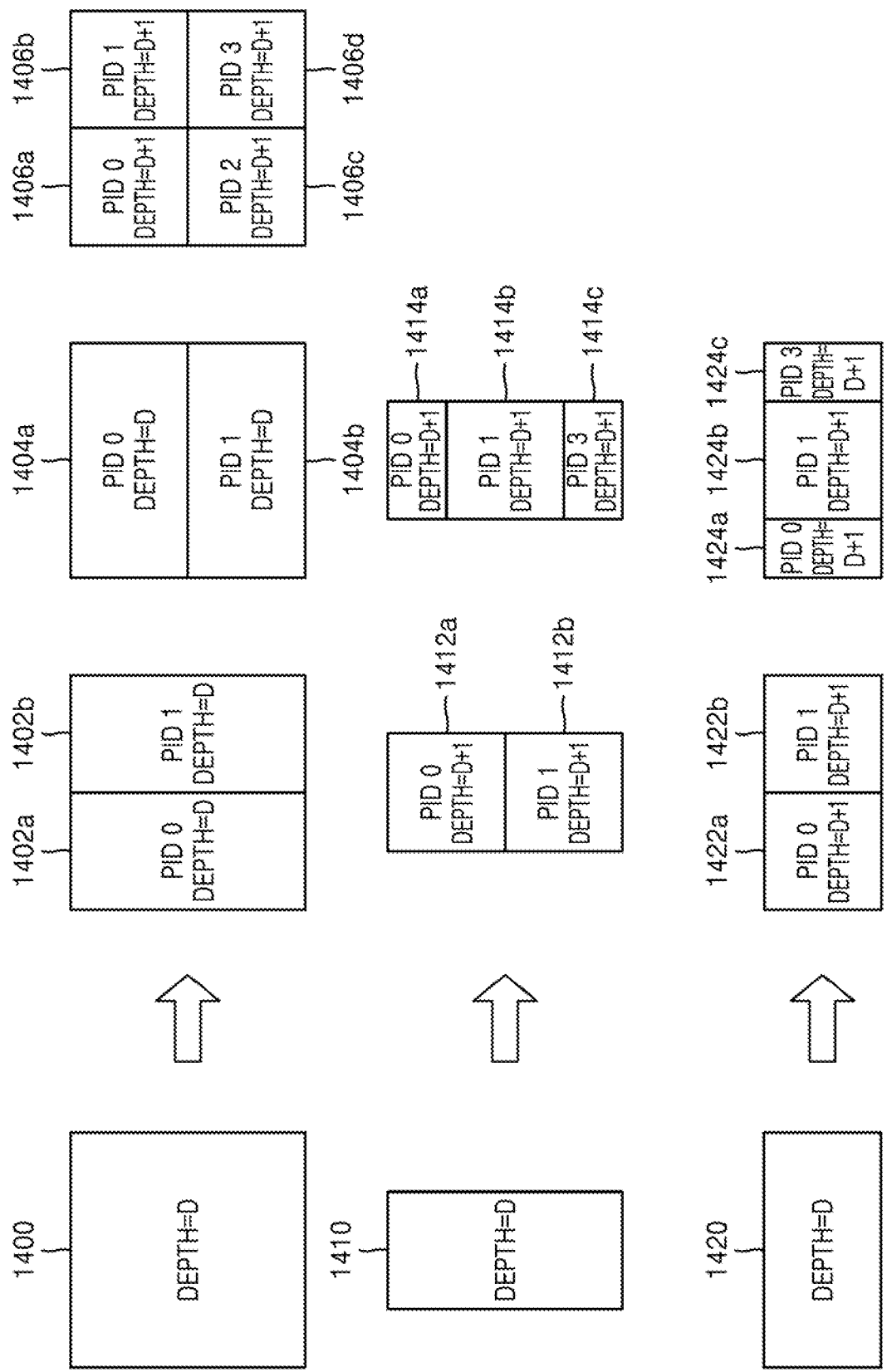
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the image decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, a depth of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, and 1414a, 1414b, and 1414c, or 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., a top left sample).

According to an embodiment, the image decoding apparatus 100 may determine a coding unit at a predetermined location from among the split coding units, by using the PIDs for distinguishing the coding units. According to an embodiment, when the information about the split shape mode of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the information about the split shape mode indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
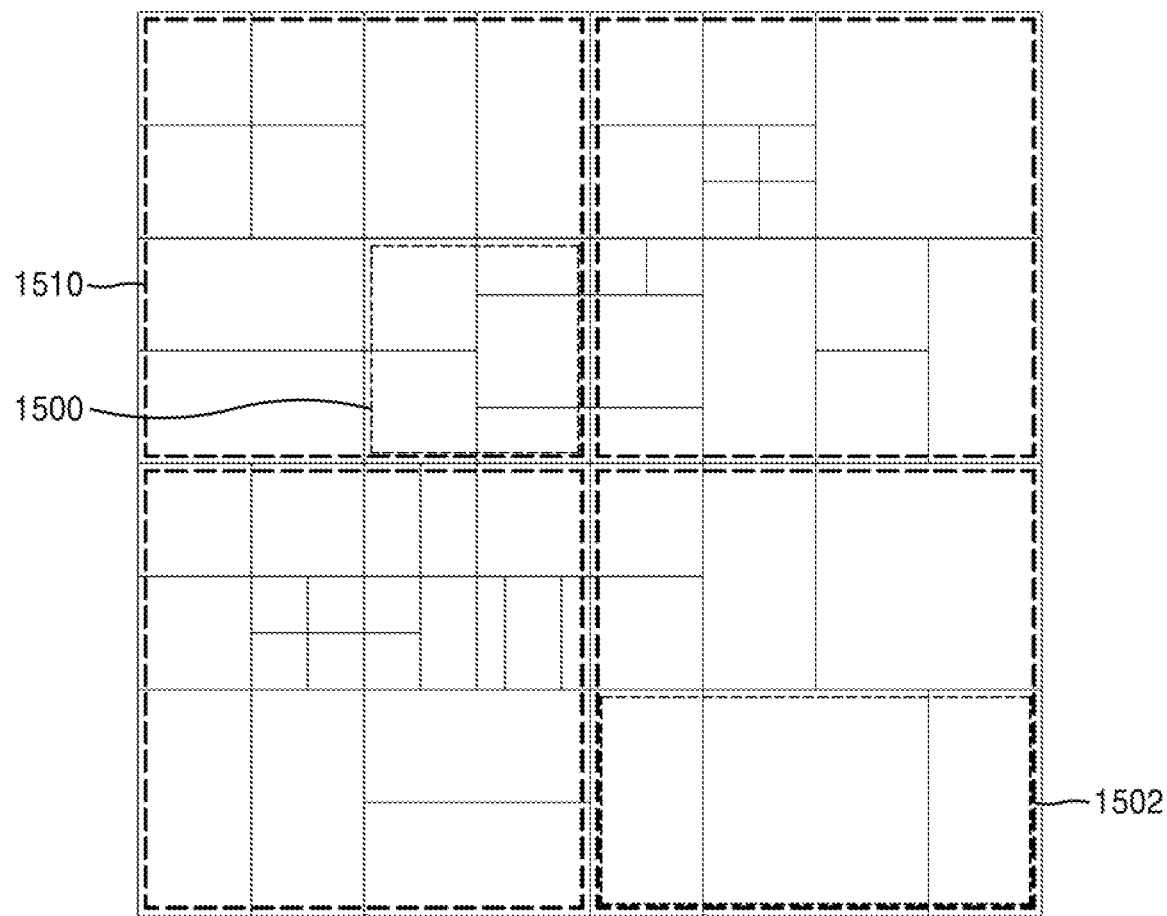
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and information about a split shape mode. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the information about the split shape mode of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the information about the split shape mode with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the information about the split shape mode according to various embodiments.

Figure 16:
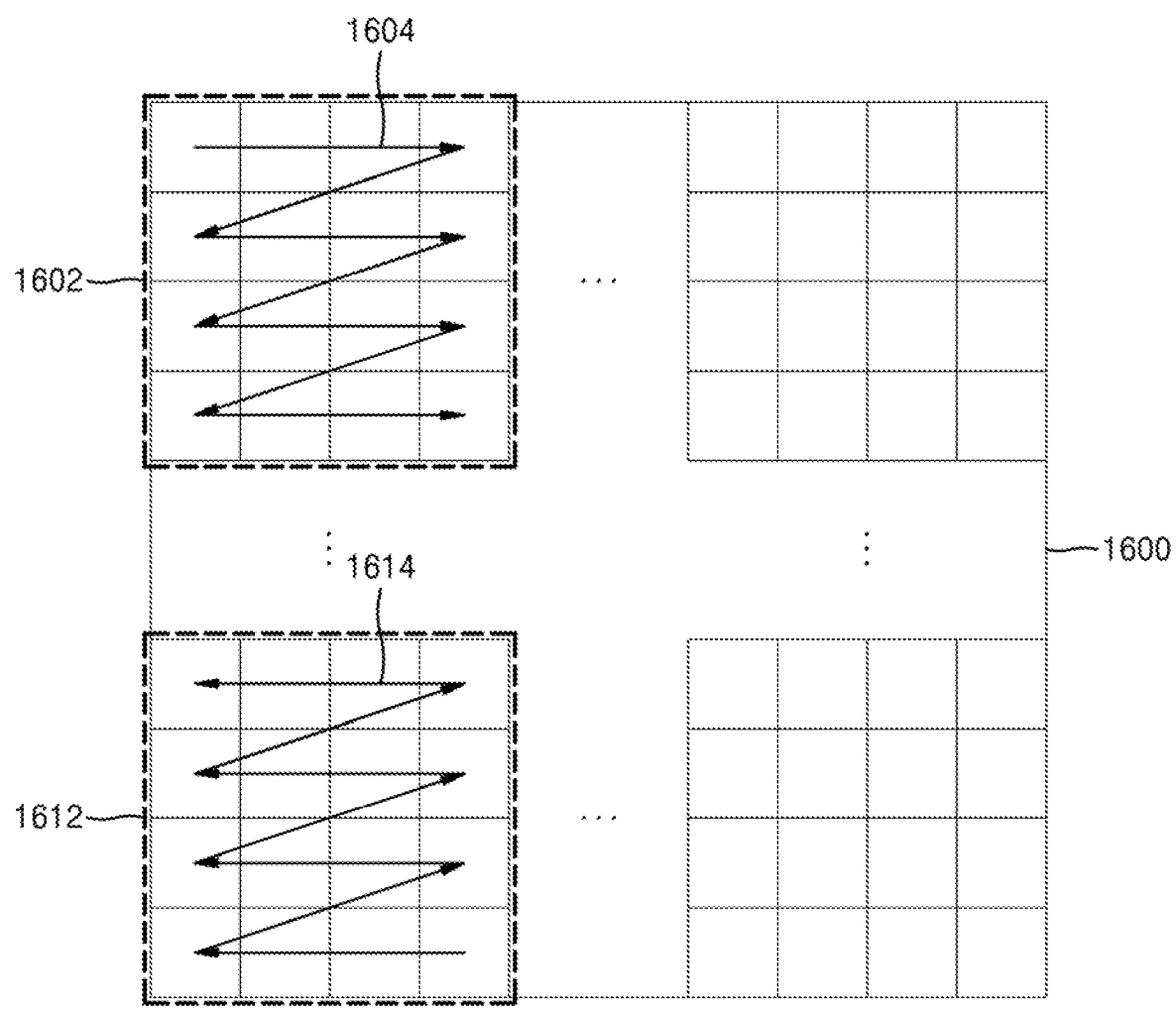
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or information about a split shape mode indicating a splitting method of the current coding unit, from the bitstream, and may use the obtained information. The block shape information or the information about the split shape mode may be included in the bitstream related to various data units. For example, the image decoding apparatus 100 may use the block shape information or the information about the split shape mode included in a sequence parameter set, a picture parameter set, a video parameter set, a slice header, or a slice segment header. Furthermore, the image decoding apparatus 100 may obtain, from the bitstream, a syntax element corresponding to the block shape information or the information about the split shape mode according to each largest coding unit, each reference coding unit, or each processing block, and may use the obtained syntax element.

FIG. 17 is a diagram for describing block shape information according to an embodiment.

The block shape information may include a shape, direction, ratio of width and height, or size of a coding unit. Referring to a table 1700, the shape of the coding unit may include a square and a non-square. When the lengths of the width and height of the coding unit are the same, the image decoding apparatus 100 may determine the shape of the coding unit to be a square. Also, when the shape of the coding unit is the square, the image decoding apparatus 100 may determine the ratio of width and height of the coding unit to be 1:1.

The image decoding apparatus 100 may determine the shape of the coding unit to be a non-square. When the shape of the coding unit is the non-square, the ratio of width and height of the coding unit may include at least one of 1:2, 2:1, 1:4, 4:1, 1:8, and 8:1.

When the length (N) of the width of the coding unit is ½ of the length (2N) of the height, the image decoding apparatus 100 may determine the shape of the coding unit to be the non-square. Also, the image decoding apparatus 100 may determine the ratio of the width and height of the coding unit to be 1:2. Also, because the length of width of the coding unit is shorter than the length of height, the image decoding apparatus 100 may determine the direction of the coding unit to be a vertical direction.

When the length (2N) of the width of the coding unit is 2 times the length (N) of the height, the image decoding apparatus 100 may determine the shape of the coding unit to be the non-square. Also, the image decoding apparatus 100 may determine the ratio of the width and height of the coding unit to be 2:1. Also, because the length of width of the coding unit is longer than the length of height, the image decoding apparatus 100 may determine the direction of the coding unit to be a horizontal direction.

When the length (N) of the width of the coding unit is ¼ of the length (4N) of the height, the image decoding apparatus 100 may determine the shape of the coding unit to be the non-square. Also, the image decoding apparatus 100 may determine the ratio of the width and height of the coding unit to be 1:4. Also, because the length of width of the coding unit is shorter than the length of height, the image decoding apparatus 100 may determine the direction of the coding unit to be the vertical direction.

When the length (4N) of the width of the coding unit is 4 times the length (N) of the height, the image decoding apparatus 100 may determine the shape of the coding unit to be the non-square. Also, the image decoding apparatus 100 may determine the ratio of the width and height of the coding unit to be 4:1. Also, because the length of width of the coding unit is longer than the length of height, the image decoding apparatus 100 may determine the direction of the coding unit to be the horizontal direction.

When the length (N) of the width of the coding unit is ⅛ of the length (8N) of the height, the image decoding apparatus 100 may determine the shape of the coding unit to be the non-square. Also, the image decoding apparatus 100 may determine the ratio of the width and height of the coding unit to be 1:8. Also, because the length of width of the coding unit is shorter than the length of height, the image decoding apparatus 100 may determine the direction of the coding unit to be the vertical direction.

When the length (8N) of the width of the coding unit is 8 times the length (N) of the height, the image decoding apparatus 100 may determine the shape of the coding unit to be the non-square. Also, the image decoding apparatus 100 may determine the ratio of the width and height of the coding unit to be 8:1. Also, because the length of width of the coding unit is longer than the length of height, the image decoding apparatus 100 may determine the direction of the coding unit to be the horizontal direction.

FIG. 18 is a diagram for describing block shape information according to an embodiment.

Referring to a table 1800, a coding unit may have various sizes. The image decoding apparatus 100 may determine the length of the width of the coding unit to be at least one of 4, 8, 16, 32, 64, and 128. Also, the image decoding apparatus 100 may determine the ratio of width and height of the coding unit to be at least one of 8:1, 4:1, 2:1, 1:1, 1:2, 1:4, and 1:8. The image decoding apparatus 100 may determine the size of the coding unit, based on the length of long side of the coding unit and the ratio of width and height of the coding unit. For example, the image decoding apparatus 100 may determine the length of width of the coding unit to be 4. Also, the image decoding apparatus 100 may determine the ratio of the width and height of the coding unit to be 1:1. The image decoding apparatus 100 may determine the size of the coding unit to be 4×4, based on the length of long side of the coding unit and the ratio of width and height of the coding unit. However, an embodiment is not limited thereto, and the length of width and length of height of the coding unit may have a value equal to or greater than 256. Also, the ratio of width and height of the coding unit may include 16:1, 1:16, or the like.

The image decoding apparatus 100 may not allow the coding unit of a particular size. In the table 1800, a coding unit not allowed by the image decoding apparatus 100 is indicated by "X". For example, when the length of width of the coding unit is 4 and the ratio of width and height is 4:1, the size of coding unit is 4×1. However, the image decoding apparatus 100 may not allow the coding unit of a 4×1 size.

Hereinafter, a method, performed by the image decoding apparatus 100, of selecting a context model used for entropy-encoding and decoding will be described.

The image decoding apparatus 100 receives a bitstream from the image encoding apparatus 2200. The image decoding apparatus 100 may determine the context model based on the block shape information including at least one of the shape, direction, ratio of width and height, or size of the coding unit. The image decoding apparatus 100 may obtain a syntax element from the bitstream by performing entropy-encoding based on the context model. The image decoding apparatus 100 may reconstruct the coding unit based on the syntax element.

The syntax element is various types of information used to decode the image. The syntax element may include a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, a transform index, and the like.

The skip flag is the syntax element used to predict the coding unit. The image decoding apparatus 100 may determine whether to predict the coding unit in a skip mode or another mode, according to the skip flag. The skip mode is a mode of predicting a current block by using similarity between the current block and a peripheral block adjacent to the current block. The peripheral block may be reconstructed before the current block. The peripheral block may include bottom left, left, top left, top, top right, right, bottom right blocks of the current block. The image decoding apparatus 100 may obtain the syntax element (reference index) for selecting a reference image from the bitstream. The image decoding apparatus 100 may obtain the reference image, based on the obtained syntax element (reference index). The image decoding apparatus 100 may determine a motion vector of the current block by using a motion vector of the peripheral block. Also, the image decoding apparatus 100 may obtain a reference block included in the reference image, based on the motion vector of the current block. In the skip mode, the image decoding apparatus 100 may reconstruct the current block, based on the obtained reference block without obtaining information related to residual from the bitstream.

The prediction mode is a syntax element indicating whether to predict the current block in an inter mode or in an intra mode. The prediction mode may be obtained from the bitstream when the skip flag indicates no skip.

When the prediction mode indicates that the current block is predicted in the inter mode, the image decoding apparatus 100 may determine whether to receive a differential motion vector to predict a current image, based on the syntax element (merge flag or direct flag) from the received bitstream. The merge flag (or direct flag) is a syntax element indicating whether to receive the differential motion vector to predict the current block.

According to an embodiment of the disclosure, when the merge flag (or direct flag) indicates to receive a motion vector difference, the image decoding apparatus 100 may obtain the differential motion vector based on the syntax element (motion vector difference) received from the bitstream. The image decoding apparatus 100 may determine the peripheral blocks of the current block to be candidate blocks. The image decoding apparatus 100 may select one of the candidate blocks based on the syntax element (motion vector prediction index) obtained from the bitstream. The image decoding apparatus 100 may obtain a motion vector of the selected candidate block as a prediction motion vector. The image decoding apparatus 100 may obtain the motion vector of the current block, based on the differential motion vector and the prediction motion vector received from the bitstream. The image decoding apparatus 100 may obtain the syntax element (reference index) for selecting the reference image from the received bitstream. The image decoding apparatus 100 may obtain the reference image based on the syntax element. The image decoding apparatus 100 may obtain the reference block included in the reference image, based on the motion vector of the current block. The image decoding apparatus 100 may obtain the current block predicted based on the reference block. The image decoding apparatus 100 may obtain the residual based on a quantized transform coefficient obtained from the bitstream. The image decoding apparatus 100 may reconstruct the current block, based on the predicted current block and residual.

According to another embodiment of the disclosure, when the merge flag indicates that the differential motion vector is not to be received, the image decoding apparatus 100 may obtain the peripheral blocks of the current block as the candidate blocks. The image decoding apparatus 100 may select one of the candidate blocks based on the syntax element (motion vector prediction index) obtained from the bitstream. The image decoding apparatus 100 may obtain the motion vector of the selected candidate block as the motion vector of the current block. The image decoding apparatus 100 may reconstruct the current block, based on the motion vector of the current block in the similar manner as when the merge flag indicates that the differential motion vector is received.

When the prediction mode indicates to predict the current block in the intra mode, the image decoding apparatus 100 may obtain the syntax element (intra prediction mode) related to an intra prediction mode from the bitstream. The image decoding apparatus 100 may select the intra prediction mode, based on the syntax element related to the intra prediction mode. The intra prediction mode may include 33 directional prediction modes, a DC mode, and a planar mode. However, an embodiment is not limited thereto, and the directional prediction modes of the intra prediction mode may be sub-divided into 62 directional prediction modes. Also, the intra prediction mode may include at least one of a DC mode, a vertical mode, a horizontal mode, a planar mode, a diagonal mode of top left and bottom right directions, and a diagonal mode of top right and bottom left directions.

When the intra prediction mode is the directional prediction mode, the intra prediction mode may receive the syntax element (prediction direction) indicating the prediction direction, from the bitstream. The image decoding apparatus 100 may select at least one of a plurality of directions, based on the syntax element.

A coded block flag (CBF) is a syntax element indicating whether at least one non-zero quantized transform coefficient is present in the coding unit (or transform unit) is present. For example, when a CBF value regarding the coding unit is 1, the image decoding apparatus 100 performs inverse transform by reading the quantized transform coefficient of the coding unit from the bitstream. Also, when the CBF value regarding the coding unit is 0, the image decoding apparatus 100 may determine that the value of all quantized transform coefficient of the coding unit is 0. Accordingly, the image decoding apparatus 100 may not perform the inverse transform regarding the coding unit. A coded block pattern (CBP) is a syntax element collectively indicating the CBF.

Quantization is a process of approximating a transform coefficient to a plurality of representative values. The image decoding apparatus 100 may obtain the quantized transform coefficient by dividing the transform coefficient by a quantization rate. The image decoding apparatus 100 may obtain the quantized transform coefficient from the bitstream and obtain the transformation coefficient by multiplying the quantization rate by the quantized transform coefficient. Because the quantization rate has a real value, an integer value corresponding to the quantization rate may be defined to reduce complexity of implementation of codec. A quantization parameter is a syntax element corresponding to the quantization rate and may have an integer value. Because the image decoding apparatus 100 may have 52 quantization rates, the quantization parameter may have a value from 0 to 51. However, an embodiment is not limited thereto.

The image decoding apparatus 100 may generate the residual that is a value of a spatial domain by inverse-transforming the transform coefficient that is a value in a frequency domain. The image decoding apparatus 100 may use a plurality of kernels for inverse transform. The image decoding apparatus 100 may perform the inverse transform by selecting one of the plurality of kernels, based on a transform index obtained from the bitstream. The transform index may be a syntax element obtained from the bitstream.

The image decoding apparatus 100 may obtain the quantization parameter for each coding unit, from the bitstream. Also, the image decoding apparatus 100 may obtain, from the bitstream, only a quantization parameter of a pre-reconstructed coding unit and a quantization parameter of a current coding unit, so as to remove redundancy of information between the quantization parameters of the pre-reconstructed coding unit and current coding unit. A delta QP is a syntax element indicating a differential value of the quantization parameter of the pre-reconstructed coding unit and the quantization parameter of the current coding unit.

Entropy coding is a lossless compression technique and operates based on a probability of occurrence of a syntax element to be encoded. The entropy coding is called entropy encoding when performed in the image encoding apparatus 2200, and the image encoding apparatus 2200 compresses the syntax element based on the entropy encoding. The entropy coding is called entropy decoding when performed in the image decoding apparatus 100, and the image decoding apparatus 100 obtains the syntax element from the bitstream based on the entropy decoding.

According to the entropy coding, short bits may be assigned to the syntax element appearing frequently and long bits may be assigned to the syntax element appearing less frequently, by using statistics of the syntax element. According to the entropy coding, transmission efficiency of bits may be increased because the same information may be transmitted with short bits. Types of the entropy coding may include context-adaptive binary arithmetic coding (CABAC) or context-adaptive variable length coding (CAVLC).

For the entropy coding, the context model applying a probability value to a bin to be decoded may be assigned, and the bin may be coded (entropy-encoded/entropy-decoded) based on the assigned context model. The context model may be updated after coding on each bin.

Hereinafter, a process of obtaining the syntax element by using the context model by the image decoding apparatus 100, according to an embodiment of the disclosure will be described in detail.

FIG. 19 is a diagram for describing a process of determining a context model according to block shape information, according to an embodiment.

The block shape information may include at least one of a shape, direction, a ratio of width and height, or size of a coding unit. The image decoding apparatus 100 may determine the context model of a syntax element according to the shape of the coding unit. Referring to a table 1910, the image decoding apparatus 100 may individually determine the context model with respect to a square coding unit 1911 and a non-square coding unit 1915. The square coding unit 1911 may have the ratio of lengths of width and height of 1:1. The ratio of lengths of width and height of the non-square coding unit 1915 may be at least one of 8:1, 4:1, 2:1, 1:2, 1:4, and 1:8.

The image decoding apparatus 100 may use different context models for the square coding unit 1911 and the non-square coding unit 1915. However, an embodiment is not limited thereto, and the image decoding apparatus 100 may use the same context model for the square coding unit 1911 and at least one of the ratios of lengths of width and height of the non-square coding unit 1915.

The image decoding apparatus 100 may assign an index to a context model pre-determined for the square coding unit 1911 and the non-square coding unit 1915. The image decoding apparatus 100 may determine the block shape information of a current coding unit. For example, the image decoding apparatus 100 may determine that the block shape information of the current coding unit is a square coding unit or a non-square coding unit. The image decoding apparatus 100 may determine the index for the context model, based on the block shape information of the current coding unit. The image decoding apparatus 100 may determine the context model, based on the index for the context model.

The image decoding apparatus 100 may determine the context model of the syntax element, according to the direction of the coding unit. Referring to a table 1920, the image decoding apparatus 100 may individually determine the context model for a horizontal direction coding unit 1921, a vertical direction coding unit 1923, and a square coding unit 1922. For example, the image decoding apparatus 100 may use a first context model for the horizontal direction coding unit 1921. Also, the image decoding apparatus 100 may use a second context model for the vertical direction coding unit 1923. Also, a third context model may be used for the square coding unit 1922. However, an embodiment is not limited thereto, and the image decoding apparatus 100 may use the same context model for some of the horizontal direction coding unit 1921, the vertical direction coding unit 1923, or the square coding unit 1922.

The image decoding apparatus 100 may assign an index to the context model pre-determined for each of the horizontal direction coding unit 1921, the vertical direction coding unit 1923, and the square coding unit 1922. The image decoding apparatus 100 may determine the block shape information of the current coding unit. For example, the image decoding apparatus 100 may determine that the block shape information of the current coding unit is one of a horizontal direction coding unit, a vertical direction coding unit, and a square coding unit. The image decoding apparatus 100 may determine the index for the context model, based on the block shape information of the current coding unit. The image decoding apparatus 100 may determine the context model, based on the index for the context model.

The image decoding apparatus 100 may determine the context model of the syntax element according to the ratio of lengths of width and height of the coding unit. Referring to a table 1930, the ratio of lengths of width and height of the coding unit may include at least one of 8:1, 4:1, 2:1, 1:1, 1:2, 1:4, and 1:8. However, an embodiment is not limited thereto, and the ratio of width and height of the coding unit may include 1:2^M and 2^M:1. Here, M is a positive integer. The image decoding apparatus 100 may individually determine the context model for a coding unit 1931 of which the ratio of lengths of width and height is 8:1, a coding unit 1932 of which the ratio of lengths of width and height is 4:1, a coding unit 1933 of which the ratio of lengths of width and height is 2:1, a coding unit 1934 of which the ratio of lengths of width and height is 1:1, a coding unit 1935 of which the ratio of lengths of width and height is 1:2, a coding unit 1936 of which the ratio of lengths of width and height is 1:4, and a coding unit 1937 of which the ratio of lengths of width and height is 1:8. The image decoding apparatus 100 may use different context models according to ratios. Also, the image decoding apparatus 100 may use the same context model for some ratios of lengths of width and height.

The image decoding apparatus 100 may assign an index to the context model pre-determined for each ratio of coding unit. The image decoding apparatus 100 may determine the block shape information of the current coding unit. For example, the image decoding apparatus 100 may determine that the block shape information of the current coding unit is one of 8:1, 4:1, 2:1, 1:1, 1:2, 1:4, and 1:8 ratios. The image decoding apparatus 100 may determine the index for the context model, based on the block shape information of the current coding unit. The image decoding apparatus 100 may determine the context model, based on the index for the context model.

The image decoding apparatus 100 may determine the context model based on an arithmetic relationship between the width and height of the coding unit. The image decoding apparatus 100 may determine a difference between a value obtained by performing log2 on the length of width and a value obtained by performing log2 on the length of height, as the index for the context model. The image decoding apparatus 100 may determine the context model, based on the index for the context model.

The image decoding apparatus 100 may determine the context model of the syntax element, according to the size of the coding unit. For example, the image decoding apparatus 100 may determine the context model, based on at least one of the length of width of the coding unit, the length of height of coding unit, the length of long side, the length of short side, or the area of the coding unit.

The image decoding apparatus 100 may individually determine the context model, based on the length of one side of the coding unit. Referring to a table 1940, the image decoding apparatus 100 may use the same context model for the coding units having the same length of long sides. The lengths of long sides of coding units 1941 are 4. The lengths of long sides of coding units 1942 are 8. The lengths of long sides of coding units 1943 are 16. The lengths of long sides of coding units 1944 are 32. The lengths of long sides of coding units 1945 are 64. The lengths of long sides of coding units 1946 are 128. The image decoding apparatus 100 may use different context models when the lengths of long sides are different. However, an embodiment is not limited thereto, and the image decoding apparatus 100 may use the same context model for some lengths of long sides. Also, the image decoding apparatus 100 may individually determine the context model, according to the lengths of short sides.

The image decoding apparatus 100 may assign an index to the context model pre-determined according to the lengths of long sides of the coding unit. The image decoding apparatus 100 may determine the block shape information of the current coding unit. For example, the image decoding apparatus 100 may determine the length of long side of the current coding unit to be one of 4 to 258. The image decoding apparatus 100 may determine the index for the context model, based on the block shape information of the current coding unit. The image decoding apparatus 100 may determine the context model, based on the index for the context model. For convenience of description, the length of long side is described as a reference, but the image decoding apparatus 100 may determine the index for the context model, based on the length of short side.

Also, the image decoding apparatus 100 may determine the context model, based on the length of long side of the coding unit. The image decoding apparatus 100 may determine a value obtained by performing log2 on the length of long side of the current coding unit to be the index for the context model. The image decoding apparatus 100 may determine the context model, based on the index for the context model. For convenience of description, the length of long side is described as a reference, but the image decoding apparatus 100 may determine the index for the context model, based on the length of short side. The image decoding apparatus 100 may individually determine the context model, based on the area of one side of the coding unit. For example, the image decoding apparatus 100 may use different context models for coding units having different areas. However, an embodiment is not limited thereto, and the image decoding apparatus 100 may use the same context model for different areas.

The image decoding apparatus 100 may individually determine the context model, based on a range of the area. For example, when the area of the coding unit is smaller than or equal to 64, the image decoding apparatus 100 may determine to use a first context model. Also, when the area of the coding unit is greater than 64 and smaller than or equal to 256, the image decoding apparatus 100 may determine to use a second context model. Also, when the area of the coding unit is greater than 256 and smaller than or equal to 1024, the image decoding apparatus 100 may determine to use a third context model. Also, when the area of the coding unit is greater than 1024 and smaller than or equal to 4096, the image decoding apparatus 100 may determine to use a fourth context model. For example, when the area of the coding unit is greater than 4096, the image decoding apparatus 100 may determine to use a fifth context model.

The image decoding apparatus 100 may assign an index to the context model pre-determined for each area of coding unit. The image decoding apparatus 100 may determine the block shape information of the current coding unit. For example, the image decoding apparatus 100 may determine the area of the current coding unit to be one of 16 to 65536. The image decoding apparatus 100 may determine the index for the context model, based on the block shape information of the current coding unit. The image decoding apparatus 100 may determine the context model, based on the index for the context model.

Also, the image decoding apparatus 100 may determine the context model, based on the area of the coding unit. The image decoding apparatus 100 may determine a value obtained by performing log2 on the area of the current coding unit to be the index for the context model. The image decoding apparatus 100 may determine the context model, based on the index for the context model.

The image decoding apparatus 100 may group and determine the context model of the syntax element. The image decoding apparatus 100 may set a plurality of pieces of block shape information as the same group. The image decoding apparatus 100 may set a plurality of shapes of the coding unit as one group. The image decoding apparatus 100 may set a plurality of directions of the coding unit as one group. The image decoding apparatus 100 may set a plurality of ratios of width and height of the coding unit as one group. Alternatively, the image decoding apparatus 100 may set a plurality of sizes of the coding unit as one group. One group may correspond to one context model. The image decoding apparatus 100 may determine the context model, based on the group.

For example, the image decoding apparatus 100 may determine to use the same context model for the plurality of ratios of width and height of the coding unit. Also, the image decoding apparatus 100 may determine to use the same context model for the plurality of sizes of the coding unit. For example, the image decoding apparatus 100 may determine to use the same context model for the coding units of which the ratio of width and height is 1:2 or 2:1. Also, the image decoding apparatus 100 may determine to use the same context model for the coding units of which the ratio of width and height is 1:2 or 1:4.

The image decoding apparatus 100 may determine the context model, based on a combination of the shape, direction, ratio of width and height, or size of the coding unit. The image decoding apparatus 100 may obtain, as an array (or a table), an index of the context model according to the combination of shape, direction, ratio of width and height, or size of the coding unit. The image decoding apparatus 100 may receive the array from the image encoding apparatus 2200. The image decoding apparatus 100 and the image encoding apparatus 2200 may use a pre-determined array. The array may be two or more dimensions. The image decoding apparatus 100 may determine the context model, based on the index of the context model, and obtain a syntax based on the context model.

For example, first block shape information may be the shape of coding unit. Second block shape information may be the size of coding unit. The image decoding apparatus 100 may determine the context model, based on a combination of the first block shape information and the second block shape information. When the first block shape information indicates a square and the second block shape information indicates that the length of long side is 16, the image decoding apparatus 100 may select a first context model. However, when the second block shape information indicates that the length of long side is 16 but the first block shape information indicates a non-square, the image decoding apparatus 100 may select a second context model. Also, when the first block shape information indicates a square but the second block shape information indicates that the length of long side is 32, the image decoding apparatus 100 may select a third context model. A mapping relationship between the combination of pieces of block shape information and the context model may be represented in a 2-dimensional (2D) array (or table). For convenience of description, the context model according to two pieces of block shape information has been described. However, an embodiment is not limited thereto, and the image decoding apparatus 100 may determine the context model according to three or more pieces of block shape information. An array for mapping the three or more pieces of block shape information and the context model may be 3D or more.

To determine the context model for the syntax element of the current coding unit, the image decoding apparatus 100 may use a context model for a syntax element of a peripheral coding unit adjacent to the current coding unit. Because the peripheral coding unit has been reconstructed before the current coding unit, the image decoding apparatus 100 may contain information about the context model of the peripheral coding unit. For example, the image decoding apparatus 100 may determine the context model of the peripheral coding unit to be the context model of the current coding unit.

To determine the context model for the syntax element of the current coding unit, the image decoding apparatus 100 may use the syntax element of the peripheral coding unit adjacent to the current coding unit. The syntax element of the peripheral coding unit may be similar to the syntax element of the current coding unit. For example, when the peripheral coding unit is split based on information about a split shape mode, there is a possibility that the current coding unit is split based on information about a similar split shape mode. The image decoding apparatus 100 may determine the context model of the current coding unit, based on an array (or table) of mapping the syntax element of the peripheral coding unit and the context model of the current coding unit. Also, the image decoding apparatus 100 may obtain the syntax element based on the context model of the current coding unit. The syntax element may include information about the split shape mode of the current coding unit.

FIG. 20 is a diagram for describing a method of determining a context model, according to an embodiment.

The image decoding apparatus 100 may obtain an array for mapping an index for a context model and at least one of a shape, direction, ratio of width and height, or size of a coding unit to determine the context model. The image decoding apparatus 100 and the image encoding apparatus 2200 may store the array. The image encoding apparatus 2200 may transmit the array to the image decoding apparatus 100 via a bitstream.

The array may be an 1D array. In other words, the array may match the index for the context model with one of the shape, direction, ratio of width and height, or size of the coding unit in an one-to-one manner. For example, the array may include the index for the context model regarding each coding unit of a 4×4, 4×8, 8×4, 8×8, 16×4, 16×8, 16×16 sizes and so on. The array may be a 2D array. In other words, the array may include the index for the context model regarding a combination of two of the shape, direction, ratio of width and height, or size of the coding unit. However, the array is not limited to 2D and may be 3D or more.

According to an embodiment of the disclosure, the array may be as shown in a table 2000. A horizontal axis of the table 2000 indicates the length of height. A vertical axis of the table 2000 may indicate the length of width. However, an embodiment is not limited thereto. An axis may be one of the length of width, the length of height, the length of long side, the length of short side, the ratio of lengths of width and height, and area. For example, a first axis may be the length of long side and a second axis different from the first axis may be the ratio of lengths of width and height.

The table 2000 may include indices for the context models according to at least one of the shape, direction, ratio of width and height, or size of the coding unit. The array may include indices according to the size of the coding unit. Referring to the table 2000, the indices for the coding units of 4×8, 4×16, 8×4, 8×8, and 16×8 sizes may be '4'. Also, the indices for the coding units of 8×16, 8×32, 16×8, 16×16, and 32×16 sizes may be '3'. Also, the indices for the coding units of 16×32, 16×64, 32×16, 32×32, and 64×16 sizes may be '2'. Also, the indices for the coding units of 32×64, 32×128, 64×32, 64×64, and 128×32 sizes may be '1'. Also, the indices for the coding units of 64×128, 128×64, and 128×128 sizes may be '0'.

The image decoding apparatus 100 may obtain, from the array, the index for the context model, based on at least one of the shape, direction, ratio of width and height, or size of the coding unit. Referring to the table 2000, the image decoding apparatus 100 may determine the index for the coding unit of the 64×64 size to be '1'.

The image decoding apparatus 100 may not define the index for the context model of the coding unit with respect to particular block shape information. Referring to the table 2000, the image decoding apparatus 100 may not define the index for the context model with respect to the coding units of the 4×4, 4×32, 4×64, 4×128, 32×4, 64×4, 64×8, 128×4, 128×8, and 128×16 sizes.

When the coding unit is block shape information that is not allowable for encoding and decoding of an image, the image decoding apparatus 100 may not define the index for the context model. For example, the image decoding apparatus 100 may not allow the coding unit of the 4×1 size. In this case, the image decoding apparatus 100 may not define the index for the coding unit of the 4×1 size.

Alternatively, when a syntax element is not required, the image decoding apparatus 100 may not define the index. For example, the syntax element may include information about a split shape mode. The image decoding apparatus 100 may always quad-split the coding unit of the 256×256 size. In other words, the image decoding apparatus 100 may split the coding unit of the 256×256 size without the syntax element. Accordingly, the image decoding apparatus 100 may not define the index for the context model for the syntax element of the coding unit having the 256×256 size.

Also, the image decoding apparatus 100 may determine the context model of the coding unit, based on the index for the context model. The image decoding apparatus 100 may determine the context model, based on the sum of a certain offset and the index for the context model so as to avoid interference between different syntax elements. Also, the image decoding apparatus 100 may determine a context model of a current coding unit, based on a syntax element or context model of a peripheral block adjacent to the current coding unit.

FIG. 24 is a diagram for describing a method of splitting of a current coding unit. split_unit( ) may indicate a syntax for splitting the current coding unit. Information (split_mode) about a split shape mode may include at least one of information indicating whether to perform splitting, split direction information, and split type information. The information indicating whether to perform splitting indicates whether to split the current coding unit. The split direction information indicates a split into one of a horizontal direction or a vertical direction.

The split type information indicates that a coding unit is split via one of a binary split, a tri split, or a quad split. The binary split denotes splitting one of width or height of a coding unit by ½. The tri split denotes splitting one of width or height of a coding unit by 1:2:1. The quad split denotes splitting width and height of a coding unit by ½, respectively.

For convenience of description, in the disclosure, the information (split_mode) about the split shape mode is distinguished into the information indicating whether to perform splitting, the split direction information, and the split type information, but is not limited thereto. The information about the split shape mode may be represented in combination of the information indicating whether to perform splitting, the split direction information, or the split type information. For example, the information (split_mode) about the split shape mode may indicate that the current coding unit is not split (NO_SPLIT). Also, the information about the split shape mode may include a quad split (QUAD_SPLIT). Also, the information about the split shape mode may indicate a binary vertical split (BI_VER_SPLIT). Also, the information about the split shape mode may indicate a binary vertical split (BI_VER_SPLIT). Also, the information about the split shape mode may indicate a binary horizontal split (BI_HOR_SPLIT). Also, the information about the split shape mode may indicate a tri vertical split (TRI_VER_SPLIT). Also, the information about the split shape mode may indicate a tri horizontal split (TRI_HOR_SPLIT).

The image decoding apparatus 100 may obtain the information about the split shape mode based on the bin string. The image decoding apparatus 100 may determine whether to split a coding unit, a split direction, and a split type, based on the bin string.

The bin string is information in a binary number. The bin string may include at least one bit. The image decoding apparatus 100 may determine the number of bits of the bin string, based on the number of split shape modes allowable to the current coding unit. For example, the image decoding apparatus 100 may determine that there is a mode of splitting or not splitting the current coding unit. In other words, the number of allowable split shape modes from the current coding unit may be 2. The image decoding apparatus 100 may determine the information about the split shape mode of the coding unit, based on the bin string of the information about the split shape mode including one bit. The one bit may indicate whether to perform splitting. The bit may indicate not to perform splitting (NO_SPLIT). When the bit indicates to perform splitting, the image decoding apparatus 100 may determine the split direction or the split type, based on the allowable split shape mode of the current coding unit.

Also, when the number of split shape modes allowable to the current coding unit is 3, the image decoding apparatus 100 may determine the information about the split shape mode of the coding unit, based on the bin string including 2 bits. A first bit of the bin string may indicate whether to perform splitting. A second bit of the bin string may indicate the split type or the split direction. The image decoding apparatus 100 may determine the split direction or the split type based on the allowable split shape mode of the current coding unit.

Also, when the number of split shape modes allowable to the current coding unit is 4 or 5, the image decoding apparatus 100 may split the coding unit based on the bin string including 3 bits. A first bit of the bin string may indicate whether to perform splitting. A second bit of the bin string may indicate the split type or the split direction. A third bit of the bin string may indicate the split direction or the split type. The image decoding apparatus 100 may determine the split direction or the split type based on the allowable split shape mode of the current coding unit.

The image decoding apparatus 100 may obtain the information about the split shape mode from the bitstream, but is not limited thereto. The image decoding apparatus 100 may obtain the information about the split shape mode, based on the split rule pre-agreed with the image encoding apparatus 2200. The image decoding apparatus 100 may obtain information about a pre-agreed split shape mode, based on the size of the current coding unit. For example, the image decoding apparatus 100 may determine the information about the split shape mode for the coding unit of the maximum size to be quad split (QUAD_SPLIT). Also, the image decoding apparatus 100 may determine the information about the split shape mode for the coding unit of the minimum size to be no split (NO_SPLIT).

FIG. 21 is a diagram for describing a method of determining a context model, according to an embodiment.

A block 2110 defines an array for matching an index for a context model with at least one of a shape, direction, ratio of width and height, or size of a coding unit. ifvc_tbl_split_flag_ctx indicates an index for a context model for determining a certain bit included in information about a split shape mode of a coding unit. In particular, ifvc_tbl_split_flag_ctx may be related to information indicating whether to split a current coding unit from among the information about the split shape mode. An array of the block 2110 is a 2D array of 6×6. The array of block 2110 may include {NA, 4, 4, NB, NC, NC}, {4, 4, 3, 3, NB, NC}, {4, 3, 3, 2, 2, NB}, {NB, 3, 2, 2, 1, 1}, {NC, NB, 2, 1, 1, 0}, and {NC, NC, NB, 1, 0, 0} NA, NB, and NC denote that information about a split shape mode is not defined. For example, when the current coding unit is unable to be split further, the image decoding apparatus 100 may not need to define a context model. Also, a context model may not be defined for a size of a coding unit that is not allowed in the image decoding apparatus 100. The array of the block 2110 may be the same as that of the table 2000 of FIG. 20.

The image decoding apparatus 100 and the image encoding apparatus 2200 may pre-store the array. Also, the image decoding apparatus 100 may obtain the array from the bitstream.

The image decoding apparatus 100 may determine the context model further based on block shape information including at least one of the shape, direction, ratio of width and height, or size of the peripheral coding unit adjacent to the coding unit. The peripheral coding unit may include at least one of a coding unit located at bottom left, left, top left, top, right, top right, or bottom right of the coding unit. The peripheral coding unit may be reconstructed before the current coding unit. Because the peripheral coding unit is adjacent to the current coding unit temporally or spatially, the similar context model may be used. Accordingly, when the context model is determined further based on the block shape information of the peripheral coding unit, the less number of bits may be used to entropy-code the syntax element.

For example, the image decoding apparatus 100 may compare the length of width of the peripheral coding unit and the length of width of the current coding unit. Also, the image decoding apparatus 100 may compare the lengths of heights of left and right peripheral blocks and the length of height of the coding unit. The image decoding apparatus 100 may determine the context model, based on comparison results. A case in which the context model is determined further based on at least one of the shape, direction, ratio of width and height, or size of the peripheral coding unit will be described in detail with reference to a block 2120.

Referring to the block 2120, w[i] may indicate the width of the peripheral coding unit. h[i] may indicate the height of the peripheral coding unit. Also, when i is '0', a top peripheral coding unit may be indicated. When i is '1', a left peripheral coding unit may be indicated. when i is '2', a right peripheral coding unit may be indicated.

The image decoding apparatus 100 may compare the width of the current coding unit and the width of the top peripheral coding unit. Also, the image decoding apparatus 100 may obtain comparison result information (smaller[0]). For example, when the width of the current coding unit is greater than the width of the top peripheral coding unit, the image decoding apparatus 100 may set the comparison result information (smaller[0]) to be '1'. When the width of the current coding unit is not greater than the width of the top peripheral coding unit, the image decoding apparatus 100 may set the comparison result information (smaller[0]) to be '0'.

The image decoding apparatus 100 may compare the height of the current coding unit and the height of the left or right peripheral coding unit. Also, the image decoding apparatus 100 may obtain comparison result information (smaller[1] or smaller[2]). For example, when the height of the current coding unit is greater than the height of the left or right peripheral coding unit, the image decoding apparatus 100 may set the comparison result information (smaller[1] or smaller[2]) to be '1'. When the height of the current coding unit is not greater than the height of the left or right peripheral coding unit, the image decoding apparatus 100 may set the comparison result information (smaller[1] or smaller[2]) to be '0'.

The image decoding apparatus 100 may obtain the context model (ctx) based on comparison results. For example, the context model (ctx) may be determined based on a smaller number among '2' and the sum (smaller[0]+smaller[1]+smaller[1]) of the comparison result information. The image decoding apparatus 100 may obtain the index (ifvc_tbl_split_flag_ctx) for the context model, based on an array of the block 2110. log2_cuw is a value obtained by performing log2 on the width of the current coding unit. Also, log2_cuh is a value obtained by performing log2 on the height of the current coding unit. The image decoding apparatus 100 may obtain the index (ifvc_tbl_split_flag_ctx[log2_cuw−2][log2_cuh−2]) for the context model, from the array of the block 2110, based on the size of the current coding unit. The image decoding apparatus 100 may determine the context model (ctx), based on the index for the context model. The image decoding apparatus 100 may obtain the syntax element by entropy-decoding the bitstream based on the context model (ctx). The syntax element may be information indicating whether to split the current coding unit.

The image decoding apparatus 100 may determine the context model (ctx_dir) regarding split direction information, based on the size of the coding unit. Referring to a block 2130, log2_cuw is a value obtained by performing log2 on the width of the current coding unit. Also, log2_cuh is a value obtained by performing log2 on the height of the current coding unit. The image decoding apparatus 100 may determine the context model (ctx_dir) regarding the split direction information, based on the lengths of width and height of the coding unit. In particular, the image decoding apparatus 100 may determine the context model (ctx_dir) regarding the split direction information, based on a value related to a ratio of width and height of the coding unit. log2_cuw-log2_cuh is a value obtained by performing log2 on a value obtained by dividing the width by height of the coding unit. In other words, log2_cuw-log2_cuh may be a value related to the ratio of width and height of the coding unit.

The image decoding apparatus 100 may obtain the context model (ctx_dir) further based on an offset (dir_ctx_offset). The offset (dir_ctx_offset) may be a value for avoiding redundancy with a context model for another syntax. The offset may be an integer including 0. The image decoding apparatus 100 may obtain the syntax element regarding the split direction information by entropy-decoding the bitstream, based on the context model (ctx_dir). The image decoding apparatus 100 may determine a split shape mode of the current coding unit based on the split direction information. For example, the split shape mode of the current coding unit may be a horizontal split or a vertical split. The image decoding apparatus 100 may split the coding unit based on the split direction information.

The image decoding apparatus 100 may determine the context model (ctx_typ) regarding split type information, based on an offset (typ_ctx_offset). Referring to a block 2140, the image decoding apparatus 100 may obtain the context model (ctx_typ) based on the offset (typ_ctx_offset). The offset (typ_ctx_offset) is a value for avoiding redundancy with another context model. The offset (typ_ctx_offset) may be a value pre-determined between the image encoding apparatus 2200 and the image decoding apparatus 100. Alternatively, the image encoding apparatus 2200 may transmit information about the offset (typ_ctx_offset) to the image decoding apparatus 100. The image decoding apparatus 100 may obtain the offset (typ_ctx_offset) from the bitstream. The image decoding apparatus 100 may determine a split shape mode of the current coding unit based on the split type information. For example, the split shape mode of the current coding unit may be one of a binary split, a tri split, or a quad split. The image decoding apparatus 100 may split the coding unit based on the split type information.

Figure 22:
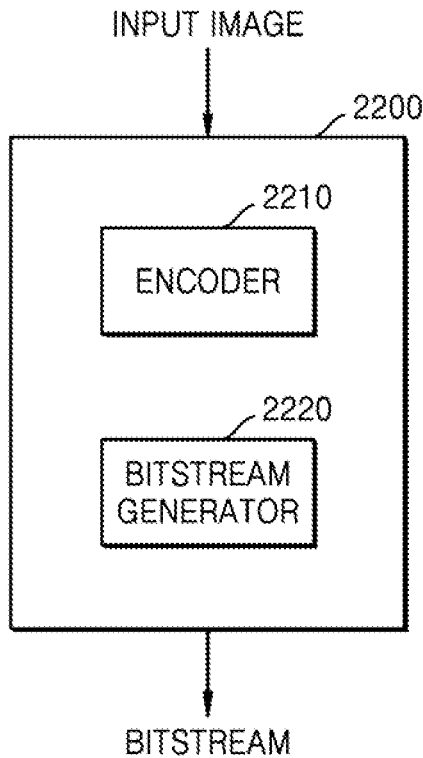
FIG. 22 is a schematic block diagram of an image encoding apparatus according to an embodiment.

FIG. 22 is a schematic block diagram of an image encoding apparatus according to an embodiment.

The image encoding apparatus 2200 may include an encoder 2210 and a bitstream generator 2220. The encoder 2210 may receive an input image and encode the input image. The encoder 2210 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 2210 may determine a context model based on block shape information including at least one of a shape, direction, ratio of width and height, or size of a coding unit.

The bitstream generator 2220 may generate a bitstream based on the encoded input image. For example, the bitstream generator 2220 may generate the bitstream by entropy-encoding the syntax element, based on the context model. Also, the image encoding apparatus 2200 may transmit the bitstream to the image decoding apparatus 100.

Detailed operations of the image encoding apparatus 2200 will be described with reference to FIG. 23.

Figure 23:
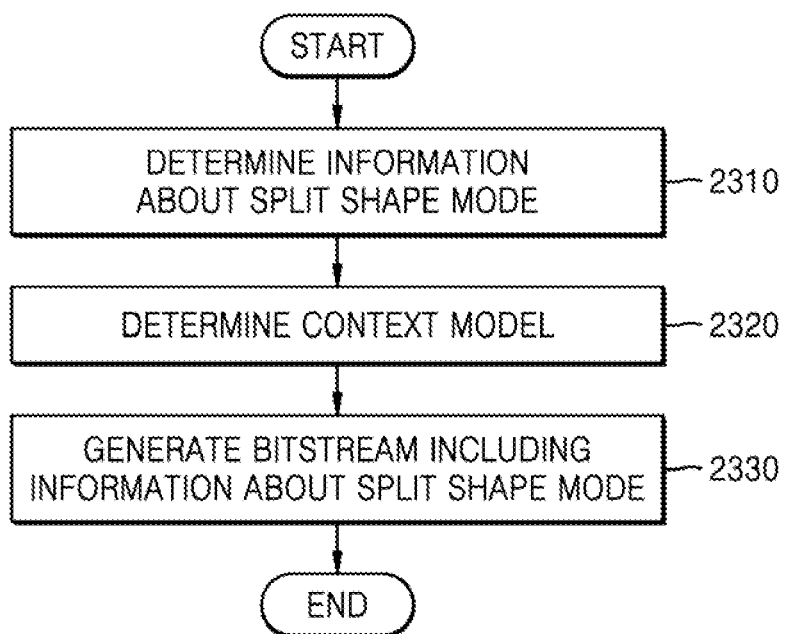
FIG. 23 is a flowchart of an image encoding method according to an embodiment.

FIG. 23 is a flowchart of an image encoding method according to an embodiment.

FIG. 23 relates to the image encoding method and includes content similar to the image decoding method and apparatus described in FIGS. 3 through 21, and redundant descriptions thereof are omitted.

The image encoding apparatus 2200 determines information about a split shape mode, based on a split shape mode of a coding unit (operation 2310). The image encoding apparatus 2200 may determine a context model based on at least one of a shape, direction, ratio of width and height, or size of a coding unit (operation 2320). The image encoding apparatus 2200 generates a bitstream including information about the split shape mode for splitting the coding unit based on the context model (operation 2330).

The image encoding apparatus 2200 may obtain an array for mapping an index for the context model and at least one of the shape, direction, ratio of width and height, or size of the coding unit to determine the context model. The image encoding apparatus 2200 may obtain, from the array, the index for the context model, based on at least one of the shape, direction, ratio of width and height, or size of the coding unit. The image encoding apparatus 2200 may determine the context model, based on the index for the context model.

The image encoding apparatus 2200 may determine the context model further based on block shape information including at least one of a shape, direction, ratio of width and height, or size of a peripheral coding unit adjacent to the coding unit, to determine the context model. Here, the peripheral coding unit may include at least one of a coding unit located at bottom left, left, top left, top, right, top right, or bottom right of the coding unit.

Also, the image encoding apparatus 2200 may compare the length of width of the top peripheral coding unit and the length of width of the coding unit to determine the context model. Also, the image encoding apparatus 2200 may compare the lengths of heights of the left and right peripheral coding units and the length of height of the coding unit. Also, the image encoding apparatus 2200 may determine the context model, based on comparison results.

Hereinabove, various embodiments have been described. One of ordinary skill in the art will understand that the disclosure may be implemented in a modified form without departing from the essential features of the disclosure. Therefore, the embodiments should be considered in descriptive sense only and not for purposes of limitation. The scope of the disclosure is set forth in the claims rather than the foregoing description, and all differences within the scope equivalent thereto should be construed as being included in the disclosure.

Meanwhile, the above-described embodiments of the disclosure may be written as a program executable on a computer, and may be implemented in a general-purpose digital computer operating a program using a computer-readable recording medium. The computer-readable recording medium includes a storage medium such as a magnetic storage medium (e.g., ROM, floppy disk, hard disk, or the like) or an optical reading medium (e.g., CD-ROM, DVD, or the like).

The invention claimed is:

1. An image decoding method comprising:
   determining a context model based on at least one of a width or a height of a neighboring coding unit of a current coding unit and at least one of a width or a height of the current coding unit;

obtaining, from a bitstream based on the context model, information about a split shape mode of the current coding unit;

when the split shape mode of the current coding unit is determined as a horizontal binary-split based on the information about the split shape mode, determining two lower coding units by splitting the height of the current coding unit in half;

when the split shape mode of the current coding unit is determined as a vertical binary-split based on the information about the split shape mode, determining the two lower coding units by splitting the width of the current coding unit in half;

when the split shape mode of the current coding unit is determined as a horizontal tri-split based on the information about the split shape mode, determining three lower coding units by splitting the height of the current coding unit by a ratio of 1:2:1;

when the split shape mode of the current coding unit is determined as a vertical tri-split based on the information about the split shape mode, determining the three lower coding units by splitting the width of the current coding unit by the ratio of 1:2:1; and when the split shape mode of the current coding unit is determined as a no-split based on the information about the split shape mode, decoding the current coding unit, wherein the neighboring coding unit includes a neighboring coding unit adjacent to the right of the current coding unit, wherein the neighboring coding unit is decoded before the current coding unit.

2. An image decoding apparatus comprising at least one processor, wherein the at least one processor is configured to:

determine a context model based on at least one of a width or a height of a neighboring coding unit of a current coding unit and at least one of a width or a height of the current coding unit;

obtain, from a bitstream based on the context model, information about a split shape mode of the current coding unit;

when the split shape mode of the current coding unit is determined as a horizontal binary-split based on the information about the split shape mode, determining two lower coding units by splitting the height of the current coding unit in half;

when the split shape mode of the current coding unit is determined as a vertical binary-split based on the information about the split shape mode, determining the two lower coding units by splitting the width of the current coding unit in half;

when the split shape mode of the current coding unit is determined as a horizontal tri-split based on the information about the split shape mode, determining three lower coding units by splitting the height of the current coding unit by a ratio of 1:2:1;

when the split shape mode of the current coding unit is determined as a vertical tri-split based on the information about the split shape mode, determining the three lower coding units by splitting the width of the current coding unit by the ratio of 1:2:1; and when the split shape mode of the current coding unit is determined as a no-split based on the information about the split shape mode, decode the current coding unit, wherein the neighboring coding unit includes a neighboring coding unit adjacent to the right of the current coding unit, wherein the neighboring coding unit is decoded before the current coding unit.

3. An image encoding method comprising:

when a split shape mode of a current coding unit is determined as a horizontal binary-split, determining two lower coding units by splitting a height of the current coding unit in half;

when the split shape mode of the current coding unit is determined as a vertical binary-split, determining the two lower coding units by splitting a width of the current coding unit in half;

when the split shape mode of the current coding unit is determined as a horizontal tri-split, determining three lower coding units by splitting the height of the current coding unit by a ratio of 1:2:1;

when the split shape mode of the current coding unit is determined as a vertical tri-split, determining the three lower coding units by splitting the width of the current coding unit by the ratio of 1:2:1;

when the split shape mode of the current coding unit is determined as a no-split, decoding the current coding unit;

determining a context model based on at least one of a width or a height of a neighboring coding unit of the current coding unit and at least one of the width or the height of the current coding unit; and encoding information about the split shape mode of the current coding unit into a bitstream by performing entropy coding based on the context model, wherein the neighboring coding unit includes a neighboring coding unit adjacent to the right of the current coding unit, wherein the neighboring coding unit is encoded before the current coding unit.

4. A non-transitory computer readable storage medium storing a bitstream generated by a video encoding method, the bitstream comprising:

information about a split shape mode of a current coding unit indicating one of a horizontal binary-split, a vertical binary-split, a horizontal tri-split, a vertical tri-split and no-split, wherein:

when the split shape mode of the current coding unit is determined as the horizontal binary-split, two lower coding units are determined by splitting a height of the current coding unit in half, when the split shape mode of the current coding unit is determined as the vertical binary-split, the two lower coding units are determined by splitting a width of the current coding unit in half, when the split shape mode of the current coding unit is determined as the horizontal tri-split, three lower coding units are determined by splitting the height of the current coding unit by a ratio of 1:2:1, when the split shape mode of the current coding unit is determined as the vertical tri-split, the three lower coding units are determined by splitting the width of the current coding unit by the ratio of 1:2:1, when the split shape mode of the current coding unit is determined as the no-split, the current coding unit is decoded, a context model is determined based on at least one of a width or a height of a neighboring coding unit of the current coding unit and at least one of the width or the height of the current coding unit, and the information about the split shape mode of the current coding unit is encoded into the bitstream by performing entropy coding based on the context model, wherein the neighboring coding unit includes a neighboring coding unit adjacent to the right of the current coding unit, and wherein the neighboring coding unit is encoded before the current coding unit.

* * * * *